(12) United States Patent
Titus

(10) Patent No.: US 7,822,849 B2
(45) Date of Patent: Oct. 26, 2010

(54) APPARATUS AND METHOD FOR MEASURING AND USING RESPONSE TO SNMP REQUESTS TO PROVIDE REAL-TIME NETWORK PARAMETER ESTIMATES IN A NETWORK MANAGEMENT ZONE

(75) Inventor: Timothy G. Titus, Sunnyvale, CA (US)

(73) Assignee: Path Solutions, Inc., Sunnyvale, CA (US)

( * ) Notice: Subject to any disclaimer, the term of this patent is extended or adjusted under 35 U.S.C. 154(b) by 247 days.

(21) Appl. No.: 11/985,861

(22) Filed: Nov. 16, 2007

(65) Prior Publication Data
US 2008/0201468 A1 Aug. 21, 2008

Related U.S. Application Data

(60) Provisional application No. 60/859,671, filed on Nov. 16, 2006.

(51) Int. Cl.
*G06F 15/16* (2006.01)
(52) U.S. Cl. .................................................. 709/224
(58) Field of Classification Search ............ 709/224
See application file for complete search history.

(56) References Cited

U.S. PATENT DOCUMENTS

| | | | | |
|---|---|---|---|---|
| 6,285,665 | B1 * | 9/2001 | Chuah | 370/319 |
| 6,304,892 | B1 * | 10/2001 | Bhoj et al. | 709/202 |
| 7,447,153 | B2 * | 11/2008 | Klinker | 370/231 |
| 2003/0200303 | A1 * | 10/2003 | Chong | 709/224 |
| 2004/0230676 | A1 * | 11/2004 | Spivack et al. | 709/223 |
| 2005/0185587 | A1 * | 8/2005 | Klinker | 370/237 |
| 2006/0149840 | A1 * | 7/2006 | Thompson et al. | 709/224 |
| 2008/0201468 | A1 * | 8/2008 | Titus | 709/224 |

OTHER PUBLICATIONS

Paxson, V. 1997. End-to-end Internet packet dynamics. SIGCOMM Comput. Commun. Rev. 27, 4 (Oct. 1997).*
Ahsan Habib, Maleq Khan, Bharat Bhargava, Edge-to-edge measurement-based distributed network monitoring, Computer Networks, vol. 44, Issue 2, 5 Feb. 2004.*
Chenjie Liu; Pei Cao, "Maintaining strong cache consistency in the World-Wide Web," Distributed Computing Systems, 1997., Proceedings of the 17th International Conference on , vol., No., May 27-30, 1997.*

* cited by examiner

*Primary Examiner*—Ajay Bhatia
(74) *Attorney, Agent, or Firm*—GSS Law Group

(57) ABSTRACT

Method creates Real-Time Estimates (RTE) of network parameters for responsive resources of a network management zone (NMZ) by sending requests in a management protocol and uses those real-time estimates to present a resource map of the NMZ, possibly altering a responsive resource, possibly posting a service schedule request. The invention includes implementation mechanisms and installation packages. The RTE of network parameter is a product of the process. Constructing a quality of service measure from RTE of at least two network parameters. Quality of service measure as a product of the process. The quality of service measure may include or be the Mean Opinion Score.

37 Claims, 17 Drawing Sheets

Fig. 8A

| Table 960 | Responsive resource 600-1 | | Responsive resource 600-2 | | |
|---|---|---|---|---|---|
| | Net parm 500-1 | 2nd Net prm 500-2 | Net parm 500-1 | 2nd Net prm 500-2 | 3rd Net prm 500-3 |
| Time step 962-1 | RT est 450-111 | RT est 450-121 | RT est 450-211 | RT est 450-221 | RT est 450-231 |
| Time step 962-2 | RT est 450-112 | RT est 450-222 | RT est 450-212 | RT est 450-222 | RT est 450-232 |

Fig. 8B

| Table 960 | Responsive resource 600-1 | | Responsive resource 600-2 | | |
|---|---|---|---|---|---|
| | Net parm 500-1 | 2nd Net prm 500-2 | Net parm 500-1 | 2nd Net prm 500-2 | 3rd Net prm 500-3 |
| Time step 962-1 | RT est 450-111 | RT est 450-121 | RT est 450-211 | RT est 450-221 | RT est 450-231 |
| Time step 962-2 | RT est 450-112 | RT est 450-222 | RT est 450-212 | RT est 450-222 | RT est 450-232 |
| Time step 962-3 | RT est 450-113 | RT est 450-123 | RT est 450-213 | RT est 450-223 | RT est 450-233 |

Fig. 8C

| Table 960 | Responsive resource 600-1 | | Responsive resource 600-2 | | |
|---|---|---|---|---|---|
| | Net parm 500-1 | 2nd Net prm 500-2 | Net parm 500-1 | 2nd Net prm 500-2 | 3rd Net prm 500-3 |
| Time step 962-1 | RT est 450-111 | RT est 450-121 | | | |
| Time step 962-2 | RT est 450-112 | RT est 450-222 | RT est 450-212 | RT est 450-222 | RT est 450-232 |
| Time step 962-3 | RT est 450-113 | RT est 450-123 | RT est 450-213 | RT est 450-223 | RT est 450-233 |

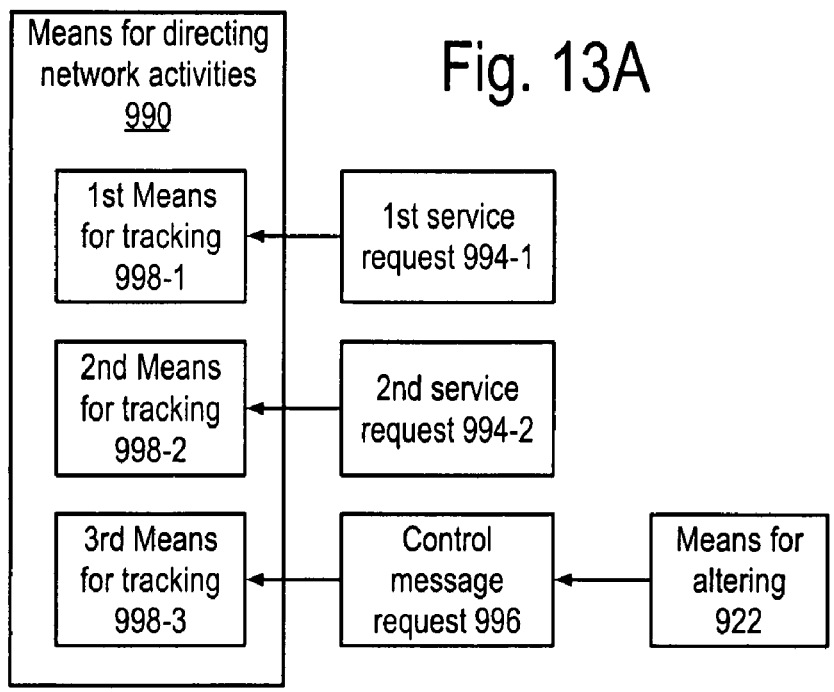
Fig. 13A
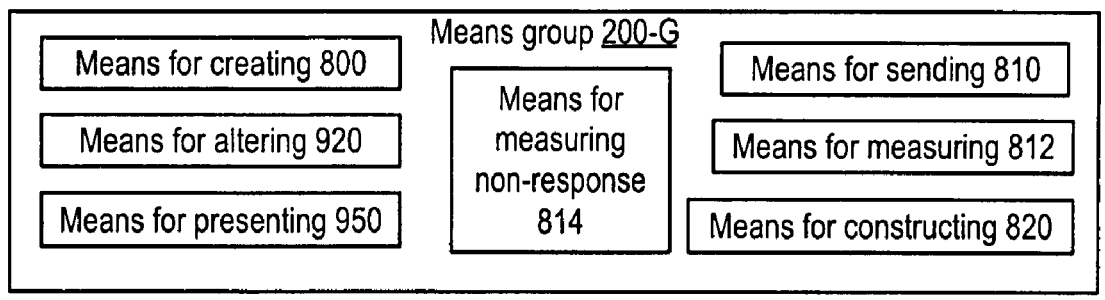
Fig. 13B
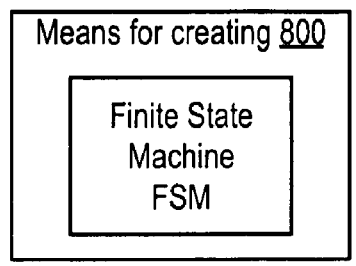 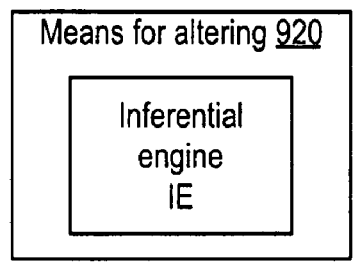
Fig. 13C    Fig. 13D

APPARATUS AND METHOD FOR MEASURING AND USING RESPONSE TO SNMP REQUESTS TO PROVIDE REAL-TIME NETWORK PARAMETER ESTIMATES IN A NETWORK MANAGEMENT ZONE

CROSS REFERENCE TO OTHER APPLICATIONS

This application claims the benefit of U.S. provisional patent application 60/859,671, filed Nov. 16, 2006, which is hereby incorporated by reference in its entirety.

TECHNICAL FIELD

This invention relates to network management methods and mechanisms using a management protocol compatible Simple Network Management Protocol to provide real-time analysis of media stream capabilities in networks, in particular, to observing responsiveness to requests to create and use real-time estimates of network parameters for responsive resources in a network management zone.

BACKGROUND OF THE INVENTION

This invention will focus on the real-time measure and use of media stream performance and capacities in a network zone. Before going into the invention's summary and disclosure, this background will address the following topics. What are real-time media streams over a network? How are media stream capabilities analyzed today? What is the Simple Network Management Protocol (SNMP)? And lastly, what are the problems with the currently available approaches?

The networking industry is rapidly converting to providing real-time media stream services, including Voice over IP (VoIP) and live video over EP. Today such services are typically packet based and create some strong demands on networks: Networks must provide low packet latencies so the information is able to arrive at the receiver's location rapidly. The incurred latency must also be stable (low jitter) so packets arrive at the receiver's location at regular intervals. Networks must also have very low packet loss so enough information is available to reconstruct the communications activity.

These VoIP telephone services are rapidly expanding worldwide and threatening traditional telephone services because they mimic ordinary telephone devices and use, but provide very affordable and reliable calling. Typical plans cost $29 a month for simple unlimited calling free throughout the United States and Canada, and exceptionally low per-minute rates to Europe and Asia. Some of the telephone sets can implemented as downloadable software to a laptop computer with a microphone and headphones, and other configurations allow ordinary telephones to be plugged in with a standard RJ-11 modular jack to a home broadband router, e.g., a Linksys Wireless-G WRT54GP2A-AT with two VoIP jacks.

Businesses are now able to set-up virtual Public Branch eXchange (PBX) networks in which some of the company's subscriber "extensions" are actually located at an employee's home and connected through a typical Linksys or Netgear broadband router. Such routers are ubiquitous in American and European homes, and a large fraction of these already support simple network protocol (SNMP) communication. Only the very inexpensive VoIP adapters do not already include SNMP.

Global communication network operators, located at a few centralized network management centers, are relying more and more on automated network management applications to analyze, process, display and support their networks. An increasing number of network management software applications are being marketed that use open-system standardized protocols. Particular network application tool software is possible to report lists of the network appliances, by location, and can issue trouble lists and keep track of software versions and releases. SNMP applications are conventionally used to issue alarms to central management consoles when remote network appliances fail.

According to the Carnegie-Mellon Software Engineering Institute, SNMP is a network management specification developed by the Internet Engineering Task Force (IETF) in the mid 1980s to provide standard, simplified, and extensible management of LAN-based internetworking products such as bridges, routers, and wiring concentrators. An object was to reduce the complexity of network management, and to minimize the resources needed to support it. SNMP provides for centralized, robust, interoperable network management, along with the flexibility to allow for the management of vendor-specific information. SNMP as a communication specification defines how management information can be exchanged between network management applications and management agents. There are several versions of SNMP, two of the most common are SNMPv1, and SNMPv2. SNMPv1 is a simple message-based request/response application-layer protocol that uses the User Datagram Protocol (UDP) for data delivery.

SNMPv1 network management architecture includes a Network Management Station (NMS) workstation to hosts the network management application. The SNMPv1 network management application polls management agents for information and provides control information to agents.

A Management Information Base (MIB) defines the information that to be collected and controlled by the management application. Each SNMPv1 management agent provides information contained in the MIB to the management applications and can accept control information. The MIB is a database of managed objects residing on the agent. Managed objects can be monitored, modified or controlled, e.g., a threshold, network address or counter.

The management application or user can define the relationship between the SNMPv1 manager and the management agent.

The GET_NEXT_REQUEST requests the next object instance from a table or list from an agent. The GET_RESPONSE is the returned answer to get_next_request, get_request, or set_request. The GET_REQUEST asks for the value of an object instance from the agent.

The SET_REQUEST fixes the value of an object instance within an agent.

The TRAP sends trap (event) asynchronously to network management application. Agents can conditionally send a trap when a trigger has occurred, e.g., a change in state of a device, device failure or agent initialization/restart. SNMP specifies the protocol to be used between a network management application and each management agent. It allows software and managed devices from different vendors to be managed by one SNMP network management application. A "proxy function" in SNMP enables communication with non-SNMP devices to accommodate legacy equipment.

SNMP is simple to implement, and does not require large computational or memory resources from the devices that do accommodate it. SNMP network management is based on polling and asynchronous events. Each SNMP manager polls for information gathered by the agents. Each agent collects local information and stores it in the agent's own MIB. Such information is then sent later to the SNMP manager in response to the manager's polling. SNMP events (alerts) are driven by trap messages generated as a result of certain device parameters. These parameters can be either generic or vendor device specific. Enterprise-specific trap messages are vendor proprietary and generally provide more device-specific detail.

SNMPv1 has been incorporated into many products and management platforms. It has been deployed by virtually all internet working vendors. It has been widely adopted for the enterprise business organization networks. It is well-suited for managing TCP/IP networks. SNMPv1 uses the underlying User Datagram Protocol (UDP) for data delivery, which does not ensure reliability of data transfer. The loss of data may be a limitation to a network manager, depending on the criticality of the information being gathered and the frequency at which the polling is being performed.

SNMP is best suited for network monitoring and capacity planning. SNMP does not provide even the basic troubleshooting information that can be obtained from simple network troubleshooting tools. SNMP agents do not analyze information, they just collect information and provide it to the network management application.

SNMPv1 has minimal security capability. Because SNMPv1 lacks the control of unauthorized access to critical network devices and systems, it may be necessary to restrict the use of SNMP management to non-critical networks. Lack of authentication in SNMPv1 has led many vendors to not include certain commands, thus reducing extensibility and consistency across managed devices. SNMPv2 addresses these security problems but is difficult and expensive to set up and administer (e.g., each MIB must be locally set up).

Vendors often include SNMP agents with their software and public domain agents are available. Management applications are available from a variety of vendors as well as the public domain, however they can differ greatly in terms of functionality, plots and visual displays.

SNMP out-of-the-box cannot be used to track information contained in application/user level protocols (e.g., radar track message, http, mail). However these might be accomplished through the use of an extensible (customized) SNMP agent that has user defined MIB. It is important to note that a specialized or extensible network manager may be required for use with the customized agents.

There are also concerns about the use of SNMP in the real-time domain where bounded response, deadlines, and priorities are required.

SNMPv2 is intended to be able to coexist with existing SNMPv2, but in order to use SNMPv2 as the SNMP manager or to migrate from SNMPv1 to SNMPv2, all SNMPv1 compliant agents must be entirely replaced with SNMPv2 compliant agents-gateways or bilingual managers and proxy agents were not available to support the gradual migration as of early-1995. Since SNMPv1 and SNMPv2 are incompatible with each other and SNMPv2 is not stable, it is important when procuring a managed device to determine which network management protocol(s) is supported.

SNMP is conventionally used to send messages between management client nodes and agent nodes. Management information blocks (MIB's) are used for statistic counters, port status, and other information about routers and other network devices. GET and SET commands are issued from management consoles and operate on particular MIB variables for the equipment nodes. Such commands allow network management functions to be carried out between client equipment nodes and management agent nodes. The agent nodes can issue alert or TRAP messages to the management center to report special events.

SNMP is an application protocol for network management services in the internet protocol suite. SNMP has been adopted by numerous network equipment vendors as their main or secondary management interface. SNMP defines a client/server relationship, wherein the client program, a "network manager", makes virtual connections to a server program, an "SNMP agent", on a remote network device. The data base controlled by the SNMP agent is the SNMP management information base, and is a standard set of statistical and control values. SNMP and private MIB's allow the extension of standard values with values specific to a particular agent. Directives issued by the network manager client to an SNMP agent comprise SNMP variable identifiers, e.g., MIB object identifiers or MIB variables, and instructions to either GET the value for the identifier, or SET the identifier to a new value. Thus private MIB variables allow SNMP agents to be customized for specific devices, e.g., network bridges, gateways, and routers. The definitions of MIB variables being supported by particular agents are located in descriptor files, typically written in abstract syntax notation (ASN.1) format. The definitions are available to network management client programs.

SNMP is a standard TCP/IP protocol providing for network management. SNMP is used by network administrators to monitor and map network availability, performance, and error rates. SNMP network devices use a Management Information Base (MIB) distributed data store. SNMP compliant devices include a MIB that describes the device attributes. Some attributes are fixed or "hard coded" in the MIB, and others are dynamic values calculated by agent software running on the device. Tivoli, HP OpenView, and other enterprise network management software use SNMP commands to read and write data in each device MIB. The so-called "Get" command retrieves data, and the "Set" command initiate some action on the device. For example, a "system reboot" command is implemented by defining a particular MIB attribute and issuing an SNMP Set from the manager software to write a "reboot" value into that attribute. SNMP was developed in the 1980's. The original version, SNMPv1, was too simple and only worked with TCP/IP networks. The improved specification, SNMPv2, was developed in 1992. SNMP suffers from various flaws of its own, so many networks remained on the SNMPv1 standard while others adopted SNMPv2. More recently, SNMPv3 specification was completed in an attempt to address the problems with SNMPv1 and SNMPv2 and allow administrators to move to one common SNMP standard.

Returning to the discussion of media streams, industry has created a number of codecs to deal with the problems created by latency, jitter, and packet loss. Each of these codecs have benefits and drawbacks depending on how they are implemented, and what sort of network qualities affect them.

To make sure that networks are reliable enough to provide for a real-time service, the industry has created a number of tests that combine a codec, latency, jitter, and packet loss reading to create a single score to determine the success of communications on that link with the codec. Mean Opinion Score (MOS) is one currently accepted method of creating a single measurement for a link. This score can be calculated via software by following the ITU-T G.107 E-model. This is a set of calculations performed with codec, latency, jitter, and packet loss.

To make networks reliable enough for real-time service, the networking industry has created test suites that combine codec, latency, jitter, and packet loss readings into a single score to describe the communications quality on links. The mean opinion score (MOS) is a popular method of quality rating a link. The MOS can be calculated with software written to the ITU-T G.107 E-model. Such software inputs codec, latency, jitter, and packet loss into its calculations. In Internet voice communications, the MOS provides a numerical measure of the quality of human speech at the destination end of the circuit. The scheme uses subjective tests, opinionated scores, that are mathematically averaged to obtain a system performance quantitative indicator.

Compressor/decompressor (codec) systems and digital signal processing (DSP) are used in voice communications to conserve bandwidth, but at the cost of voice fidelity. The best codec's provide the most bandwidth conservation while producing the least degradation of the signal. Bandwidth can be measured using laboratory instruments, but voice quality is subjective. To determine MOS, a number of listeners rate the quality of test sentences read aloud over the communications circuit by male and female speakers. A listener gives each sentence a rating of (1) bad; (2) poor; (3) fair; (4) good; (5) excellent. The MOS is the arithmetic mean of all the individual scores, and ranges 1-5, worst to best.

Currently, there are a number of companies providing hardware and software based solutions that require setting up network agents around the network, and they will test latency, jitter and packet loss between these agents to provide a measurement. They then calculate a MOS score against a number of codecs to help determine which codec will provide the best results on your network. If there is a high latency, or high jitter, or high packet loss, this type of test will not help in determining the actual source or cause of the problem.

There are also solutions like SmokePing that will measure latency, jitter, and packet loss from one system to any other system that will respond to an Internet Command Message Protocol (ICMP) echo request. This type of solution has the obvious benefit of not requiring agents to be installed on the network. The drawback of this type of solution is that it will do nothing to help determine the actual source or cause of the high latency, jitter, or packet loss. This type of solution is also limited in the fact that it can only make measurements to or from the monitoring station. Measurements from one end point to a different end point is not possible.

Both of these types of solutions send empty packets on the network to test the conditions of the network. These "test packets" tend to be small, but can add to network overhead on bandwidth constrained links.

What is needed is a solution that will monitor latency, jitter, and packet loss for each individual link on the network, and then determine all of the possible combinations of links to determine a quality score for all possible service paths. This type of system would then be able to identify the one or more specific links in a service path that caused packet loss to be high. The network devices attached to the link(s) could then be queried for statistics to help determine the actual source of the quality problem.

For a moment, consider the requirements and background of VoIP calls. VoIP calls are made asynchronously to the network monitoring intervals. Thus, calls are made at any time, and may last for any duration.

Many VoIP phones (both soft phones and hardware phones) will provide basic statistics at the end of the call as to what the average latency, average packet loss, and average jitter was seen during the entire call. The phones don't collect additional statistics due to memory or CPU limitations on the phone.

If a user has a VoIP call that lasts 30 minutes, and the call quality (by the user's perception) is good for 29 minutes and 30 seconds, and 30 seconds of the call end up being very poor quality, then the user's perception of the call would indicate that the call was "very bad" or "unacceptable", when the statistics over that period would show that the call quality should have been fine.

This is a result of the fact that averaging these statistics does not provide for sufficient reporting to be able to determine if a call was good or bad according to user perception.

What is also needed is a mechanism for collecting useful statistics of a call's worst interval of performance that can be time synchronized to a network monitoring system to determine why the call had poor performance.

To summarize: today network analysis is done in a static fashion, often using pings, providing non real-time estimates based upon unreal data. These estimates may include packet loss, latency, and the variance in latency, which will be referred to as jitter herein. All of this is good, but inadequate. Actual networks are real-time creatures, responding specifically to the real-time requests and device capacities, which change and fluctuate in real-time, often dramatically affecting the performance and reliability of the delivery of media stream events, such as VoIP, web casts, video conferences, and live video over IP.

What is needed are solutions that will monitor latency, jitter, and packet loss for each individual link on the network, and then determine all of the possible combinations of links to determine a quality score for all possible service paths. This type of system would then be able to identify the one or more specific links in a service path that caused packet loss to be high. The network devices attached to the link(s) could then be queried for statistics to help determine the actual source of the quality problem.

What is also needed is a mechanism for collecting useful statistics of a call's worst interval of performance that can be time synchronized to a network monitoring system to determine why the call had poor performance.

SUMMARY OF THE INVENTION

The invention's method observes a network management zone by creating a real-time estimate of at least one network parameter for at least one responsive resource in the network management zone. Each of the responsive resources in the network management zone respond to a management protocol compatible with a version of the Simple Network Management Protocol (SNMP).

Creating the real-time estimate includes sending at least one request in the network management protocol to the responsive resource at a transmission time, measuring the response to the request from the responsive resource based upon the transmission time to contribute to the real-time estimate of the network parameter, and measuring a non-response to the request after a time-out from the transmission time.

The version of the SNMP may include at least one of SNMP v1, SNMP v2c and SNMP v3.

The management protocol may be compatible with a national standard in Mainland China and/or India.

The real-time estimate may be based upon the requests whose transmission time is within the last N minutes, where N may be at most sixty, at most fifteen, at most five, or at most one. The method may further include establishing the N for the real-time estimates, and possibly distinct values of the N for different network parameters.

The responsive resource may preferably implement at least one of the following: a server, a router, a bridge, a switch, a firewall, a wireless router, a base station, a wireless hub, a workstation, a cable modem, a Digital Subscriber Line (DSL) modem, a Voice over IP (VoIP) phone, a video conferencing station, a VoIP gateway, an analog telephony attachment, and a Public Branch exchange (PBX).

The network management zone may include a link between a first responsive resource and a second responsive resource.

Creating the real-time estimate may further include creating the real-time estimate of the network parameter for the second responsive resource via the link to the first responsive resource.

Sending the request may further include sending the request in the management protocol to the second responsive resource at the transmission time via the first responsive resource and via the link.

Measuring the response may further include measuring the response to the request from the first responsive resource via the link from the second responsive resource.

The link may employ at least one instance of a wireless physical transport and/or a wireline physical transport.

The wireless physical transport includes a radio frequency physical transport, a microwave frequency physical transport, an infrared frequency physical transport, a light frequency physical transport, and an ultrasonic physical transport.

The wireline physical transport includes a wire-based physical transport, a waveguide physical transport, and an optical fiber physical transport.

The network parameter may be any of the following members of the network parameter group:

Packet loss may refer and/or include any of the following: A resource packet loss for the responsive resource. A link packet loss to the first responsive resource through the link to the second responsive resource. A message packet loss.

Latency may refer and/or include any of the following: A resource latency for the responsive resource. A unidirectional latency to the first responsive resource through the link to the second responsive resource. A bidirectional latency between the first responsive resource through the link to the second responsive resource. A message latency.

Jitter may refer and/or include any of the following: A latency jitter as a variance of the latency, A unidirectional latency jitter as the variance of the unidirectional latency. A bidirectional latency jitter as the variance of the bidirectional latency. A message latency jitter.

A link utilization capacity of the link.

And/or a resource utilization capacity of the resource.

The network management zone may further and preferably include each of the responsive resources capable of responding to the request.

The invention includes the real-time estimate of the network parameter as a product of the invention's process of observing the responsive resource to at least one request in the management protocol discussed above. The invention's method includes constructing a quality of service measure using the real-time estimate of at least two network parameters. The invention includes the quality of service measure as a product of this process. The quality of service measure may further be constructed by using real-time estimates of more than two network parameters. It may further be constructed using a codec. The quality of service measure may include the Mean Opinion Score. Alternatively, the quality of service measure may be the Mean Opinion Score.

The network management zone may further and preferably include a management node sending the requests to the responsive nodes included in the network management zone. The management node may further receive the responses to the requests from the responsive nodes.

The invention includes the management node implementing the method of observing the network management zone and including means for creating the real-time estimate of the at least one network parameter for the at least one responsive resource to the management protocol in the network management zone, which may further include means for sending the at least one request in the management protocol to the responsive resource at the transmission time, means for measuring the response to the request from the responsive resource based upon the transmission time to contribute to the real-time estimate of the network parameter, and means for measuring the non-response to the request after the time-out after the transmission time.

The invention's method may further include altering at least one of the responsive resources based upon the real-time estimate of the at least one network parameter and/or creating a service schedule request for the responsive resource based upon at least one of the estimates of the network parameter.

Altering the responsive resource may include sending a link configuration message to the responsive resource to create a link table entry in the responsive resource, sending a reset message to the responsive resource to reset the responsive resource, and/or sending a connectivity test message to the responsive resource to create a connectivity status message sent from the responsive resource to the management node.

The service schedule request may include at least one member of the service activity group. The service activity group consists of replace the responsive resource, replace a non-volatile storage module included in the responsive resource, confirm at least one link for the responsive resource, create the link for the responsive resource, create the link table entry for the link in the responsive resource, and alter the link table entry for the link in the responsive resource.

The management node may further include means for altering at least one of the responsive resources based upon the real-time estimate of at least one of the network parameters for the responsive resource. The means for altering may include any combination of the following the means for sending a link configuration message to the responsive resource to create a link table entry in the responsive resource, means for sending a reset message to the responsive resource to reset the responsive resource, and means for sending a connectivity test message to the responsive resource to create a connectivity status message sent from the responsive resource to the management node.

As used herein, the altering message group consists of the members: the link configuration message, the reset message, and the connectivity test message.

In certain embodiments, at least one member of the altering message group is compatible with a version of the Internet Control Management Protocol (ICMP).

The management node may include means for presenting the real-time estimate of the at least one network parameter for the at least one responsive resource to create a resource map of the network management zone.

The means for presenting may include the following:

A table containing the real-time estimate of the network parameter for the responsive resource at a time step, for each of the responsive resources, for each of the network parameters, and for at least two of the time steps.

And means for updating the table based upon at least one member of the response group consisting of: the response and the non-response, both to the request to the responsive resource.

The means for presenting may further include means for translating the table to a display template, means for transferring the display template to a management screen presented to a network manager, means for collecting a network command response from the network manager based upon the management screen presenting the display template, and means for directing network activities based upon the network command response.

The means for directing network activities may include means for posting a first service request for at least one of the responsive resources, means for posting a second service request for a link between a first of the responsive resources and a second of the responsive resources, and/or means for posting a control message request to a means for altering at least one of the responsive resources.

The means for directing network activities may further include means for tracking the first service request for the responsive resource, means for tracking the second service request for the link between the first responsive resource and the second responsive resource, and means for tracking the control message request to the means for altering the responsive resource.

At least one member of the means group of the management node may include at least one instance of at least one of the following: a computer accessibly coupled to a memory and directed by a program system including at least one program step residing in the memory, a finite state machine and an inferential engine.

As used herein, a computer includes at least one instruction processor and at least one data processor, where each of the data processors is at least partly directed by at least one of the instruction processors.

As used herein, the means group consists of: means for creating, means for sending, means for measuring the response, the means for measuring the non-response, and the means for presenting.

The invention further includes of a program system for communicating the invention's method, containing program steps residing in a non-volatile memory component. The program system includes at least one of the following program steps:

creating the real-time estimate of the at least one network parameter for the at least one responsive resource to the management protocol in the network management zone, and/or presenting the real-time estimate of the at least one network parameter for the at least one responsive resource to create a resource map of the network management zone, and/or altering at least one of the responsive resources based upon the real-time estimate of the at least one network parameter, and/or creating a service schedule request for the responsive resource based upon at least one of the estimate of the network parameter.

The non-volatile memory component includes at least one instance of a semiconductor non-volatile memory component, a magnetic non-volatile memory component, an optical non-volatile memory component, and/or a ferroelectric non-volatile memory component.

The non-volatile memory component installs the method through communicating with at least one computer to create an installation of the program system in a memory accessibly coupled to the computer.

The program steps may preferably be compatible with a computer language belonging to at least one member of the computer language group consisting of a markup language, an interpreted language, a script language and a machine language.

The markup language may preferably include a version of Hyper Text Markup Language (HTML) and/or a version of Virtual Reality Markup Language (VRML).

The interpreted language may preferably include a version of Java, a version of Basic, a version of Smalltalk, a version of Prolog, and/or a version of LISP.

The script language may preferably include a version of PERL and/or a version of a shell script language.

The machine language may preferably include a version of a Single Instruction Single Datapath (SISD) machine language, a version of a Single Instruction Multiple Datapath (SIMD) machine language, a version of a Multiple Instruction Single Datapath (MISD) machine language, and a version of a Multiple Instruction Multiple Datapath (MIMD) machine language. The program steps may be in a relocatable or non-relocatable format.

The invention also includes an installation package for communicating the invention's method including at least one member of the installation means group consisting of:

means for installing the step creating the real-time estimate of the at least one network parameter for the at least one responsive resource to the management protocol in the network management zone, and/or means for installing the step presenting the real-time estimate of the at least one network parameter for the at least one responsive resource to create a resource map of the network management zone, and/or means for installing the step altering at least one of the responsive resources based upon the real-time estimate of the at least one network parameter, and/or means for installing the step creating a service schedule request for the responsive resource based upon at least one of the estimate of the network parameter.

The member(s) of installation means group included in the installation package reside in the memory of a server.

At least one of these members of the installation means group includes at least one member of the installation mechanism group consisting of: a computer program system installation mechanism, a finite state machine installation mechanism, and an inferential engine installation mechanism.

BRIEF DESCRIPTION OF THE DRAWINGS

FIGS. 7A to 8C show some details of the means for presenting of FIG. 6B;

FIGS. 11A to 13A show details of the means for presenting of FIGS. 6B to 8C;

FIG. 13B shows the means group of the management node;

FIG. 13C shows the means for creating including an instance of a Finite State Machine;

FIG. 13D shows the means for altering including an inferential engine;

DETAILED DESCRIPTION

This invention relates to network management methods and mechanisms using a management protocol compatible Simple Network Management Protocol to provide real-time analysis of media stream capabilities in networks, in particular, to observing responsiveness to requests to create and use real-time estimates of network parameters for responsive resources in a network management zone.

Figure 1A:
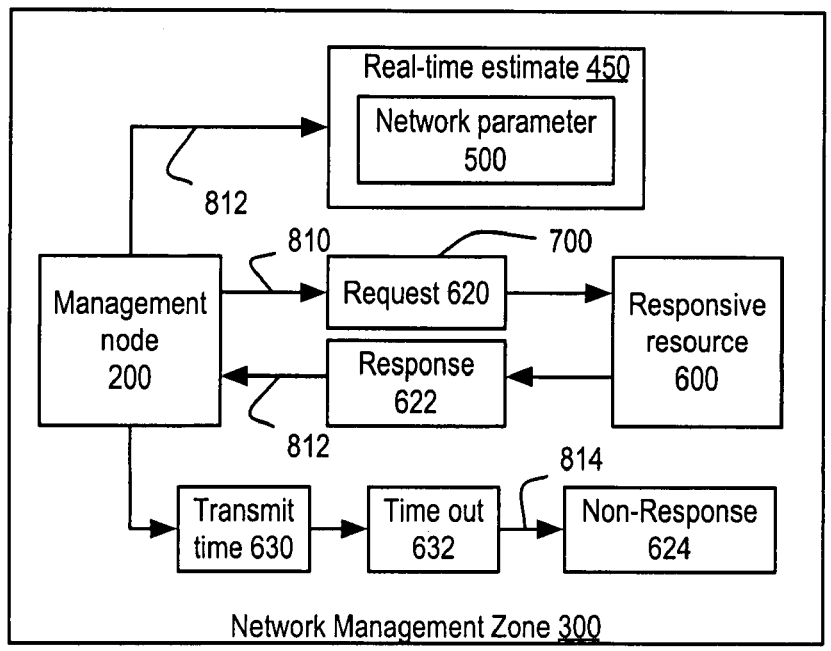
FIG. 1A shows a network management zone and the invention's method for generating a real-time estimate of a network parameter based upon at least one request to a responsive resource.
Figure 1B:
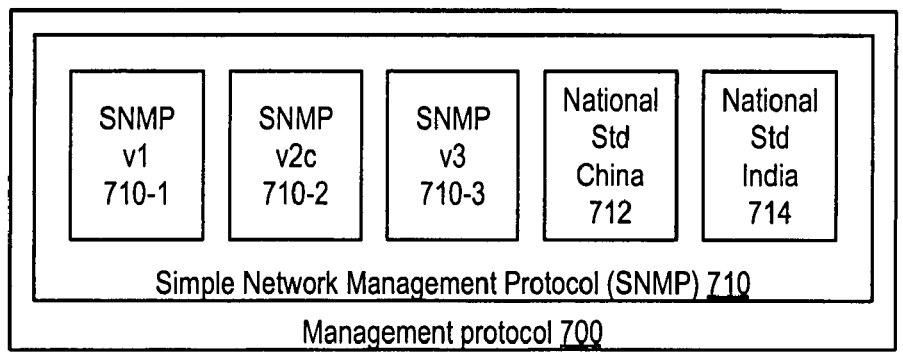
FIG. 1B shows examples of the management protocol of the requests of FIG. 1A.

The invention's method observes a network management zone 300 by creating 800 a real-time estimate 450 of at least one network parameter 500 for at least one responsive resource 600 in the network management zone as shown in FIG. 1A and subsequent Figures. Each of the responsive resources in the network management zone respond to a management protocol 700 compatible with a version of the Simple Network Management Protocol 710 also known herein as SNMP as shown in FIG. 1B.

Creating 800 the real-time estimate 450 includes sending 810 at least one request 620 in the management protocol 700 to the responsive resource 700 at a transmission time 630, measuring 812 the response 622 to the request from the responsive resource based upon the transmission time to contribute to the real-time estimate of the network parameter 500, and measuring 814 a non-response 624 to the request after a time-out 632 from the transmission time.

The version of the SNMP 710 may include at least one of SNMP v1, SNMP v2c and SNMP v3.

The management protocol 700 may be compatible with a national standard of Mainland China 712 and/or a national standard of India 714.

The real-time estimate 450 of the network parameter 500 may be based upon the more than one request 620 whose transmission time 630 is within the last N minutes, where N may be at most sixty, at most fifteen, at most five, or at most one. The method may further include establishing the N for the real-time estimates, and possibly distinct values of the N for different network parameters.

Figure 1C:
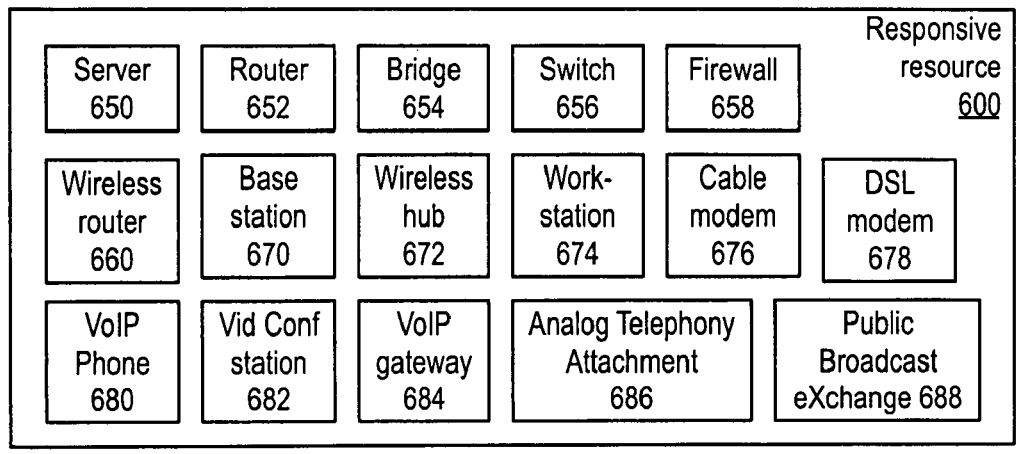
FIG. 1C shows some examples of what may be included in a responsive resource.

The responsive resource 600 may preferably implement at least one of the following as shown in FIG. 1C: a server 650, a router 652, a bridge 654, a switch 656, a firewall 658, a wireless router 660, a base station 670, a wireless hub 672, a workstation 674, a cable modem 676, a Digital Subscriber Line modem 678 (which is sometimes referred to as a DSL modem), a Voice over IP phone 680 (which is sometimes referred to as a VoIP phone), a video conferencing station 682, a VoIP gateway 684, an analog telephony attachment 686, and a Public Branch eXchange 688 (PBX).

The request 620 may not get to the responsive resource 600, or the response 622 may not get to the management node 200. For example, according to searchNetworking.com definitions, the Time-To Live (TTL) value is a value in a packet that tells a router whether or not the packet has been in the network too long and should be discarded.

For a number of reasons, packets may not get delivered to their destination in a reasonable length of time. For example, a combination of incorrect routing tables could cause a packet to loop endlessly.

A solution is to discard the packet after a certain time and send a message to the originator, who can decide whether to resend the packet. The initial TTL value is set, usually by a system default, in an 8-binary digit field of the packet header. The original idea of TTL was that it would specify a certain time span in seconds that, when exhausted, would cause the packet to be discarded.

Since each router is required to subtract at least one count from the TTL field, the count is usually used to mean the number of router hops the packet is allowed before it must be discarded. When the count reaches zero, the router detecting it discards the packet and sends an Internet Control Message Protocol (ICMP) message back to the originating host.

The default Windows 95/98 TTL value is 32 hops. Some users recommend changing this to 128 if users have difficulty reaching certain sites. The ping and the traceroute utilities both make use of the TTL value to attempt to reach a given host computer or to trace a route to that host. Traceroute intentionally sends a packet with a low TTL value so that it will be discarded by each successive router in the destination path. The time between sending the packet and receiving back the ICMP message that it was discarded is used to calculate each successive hop travel time. Using the multicast IP protocol, the TTL value indicates the scope or range in which a packet may be forwarded. By convention: 0 is restricted to the same host; 1 is restricted to the same subnet; 32 is restricted to the same site; 64 is restricted to the same region; 128 is restricted to the same continent; and, 255 is unrestricted.

The management node 200 preferably sends repeated requests 620 to the responsive resource 600. These are then used to create a real-time estimate of various kinds of jitter, such as latency jitter 514, unidirectional latency jitter 516 and bidirectional latency jitter 518.

The repeated requests 620 to the responsive resource 600 each create a response 622 or non-response 624, which are collectively used to create the real-time estimates of packet loss, for example, resource packet loss 504 and/or link packet loss 506.

Figure 2A:
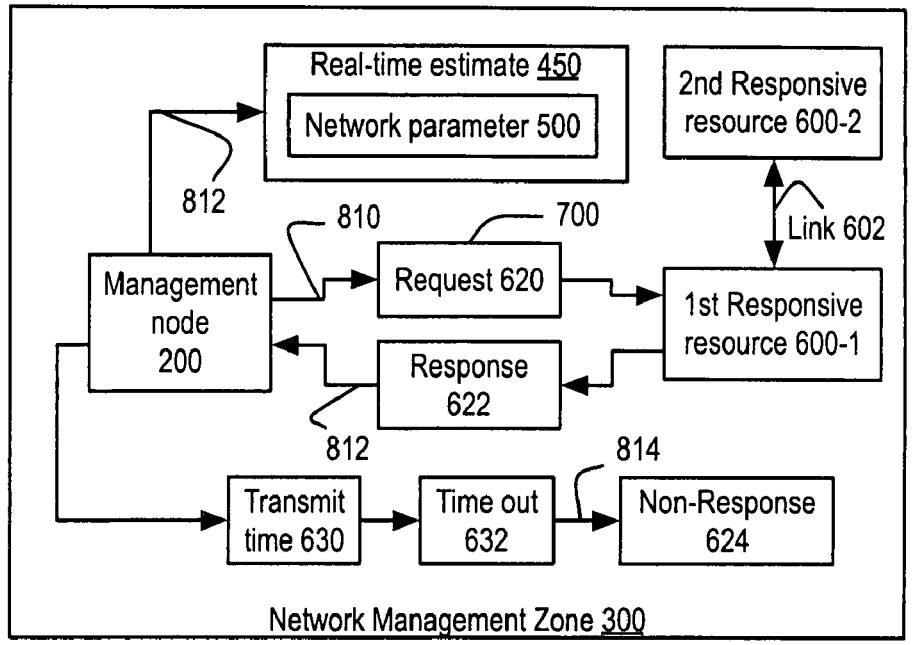
FIG. 2A shows an example of the network management zone FIG. 1A including a link between two responsive resources.

The network management zone 300 may include a link 602 between a first responsive resource 600-1 and a second responsive resource 600-2 as shown in FIG. 2A.

Creating 800 the real-time estimate 450 may further include creating the real-time estimate of the network parameter 500 for the second responsive resource 600-2 via the link 602 to the first responsive resource 600-1.

Sending 810 the request 620 may further include sending the request in the management protocol 700 to the second responsive resource 600-2 at the transmission time 630 via the first responsive resource 600-1 and via the link 602.

Measuring 812 the response 622 may further include measuring the response to the request from the first responsive resource 600-1 via the link 602 from the second responsive resource 600-2.

Figure 2B:
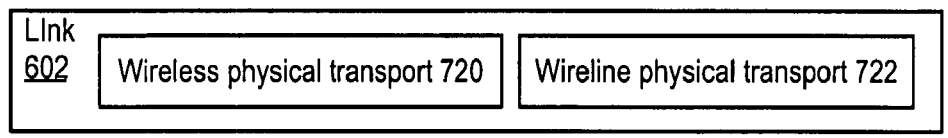
FIG. 2B shows the link may include at least one wireless physical transport and/or at least one wireline physical transport.
Figure 2C:
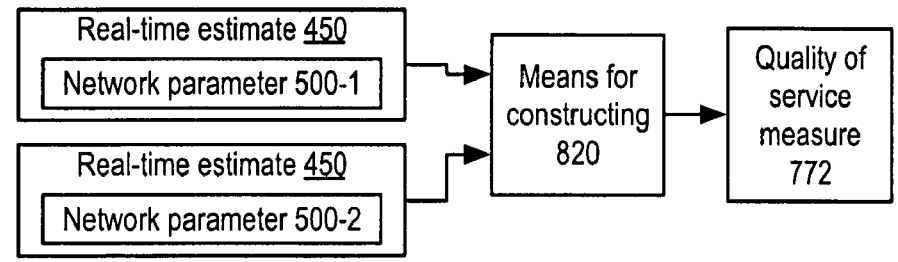
FIGS. 2C and 2D show examples of constructing a quality of service measure from the real-time estimates of multiple network parameters.

The link 602 may employ at least one instance of a wireless physical transport 720 and/or a wireline physical transport 722 as shown in FIG. 2B.

Figure 3A:
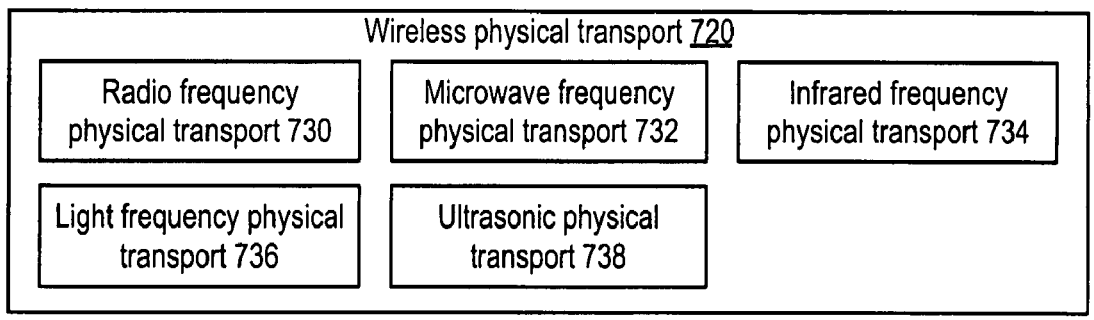
FIG. 3A shows some details of the wireless physical transport of FIG. 2B.

The wireless physical transport 720 may include a radio frequency physical transport 730, a microwave frequency physical transport 732, an infrared frequency physical transport 734, a light frequency physical transport 736, and an ultrasonic physical transport 738, as shown in FIG. 3A.

Figure 3B:
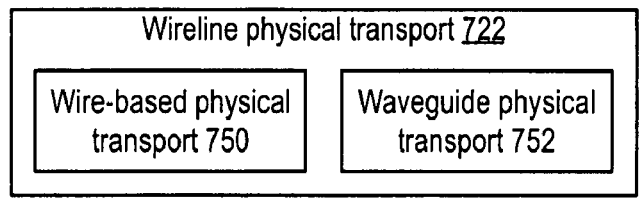
FIG. 3B shows some details of the wireline physical transport of FIG. 2B.

The wireline physical transport 722 includes a wire-based physical transport 750 and a waveguide physical transport 752 as shown in FIG. 3B.

Figure 3C:
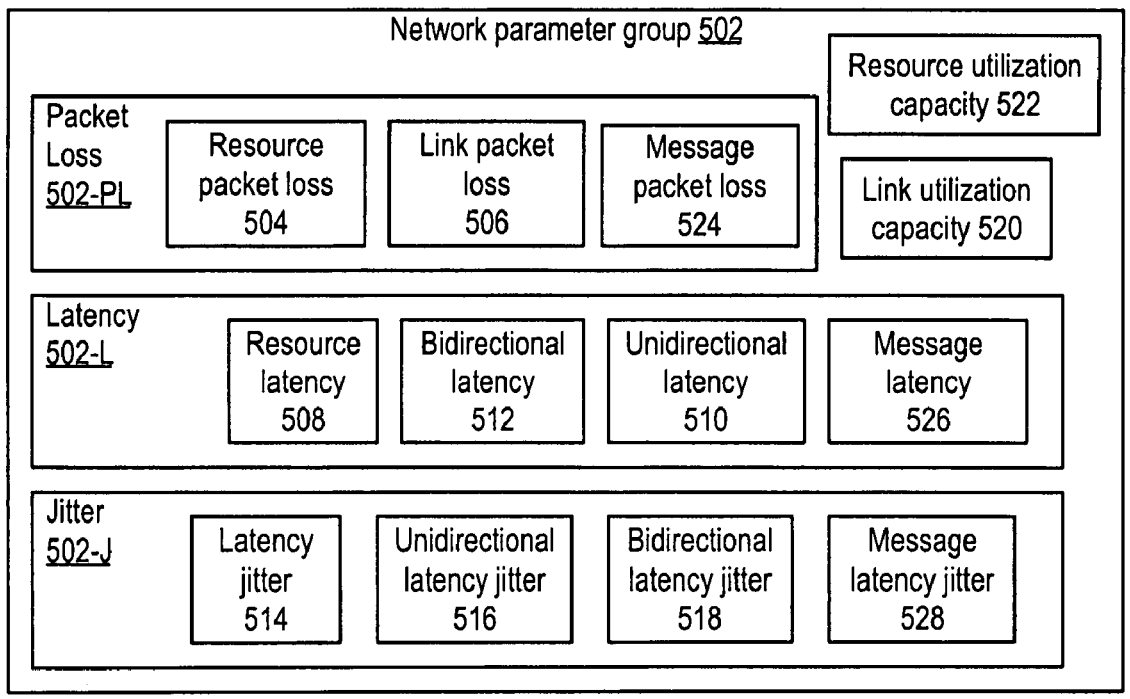
FIG. 3C shows some details of the network parameter of FIGS. 1A and 2A.

The network parameter 500 may be any of the following members of the network parameter group 502 as shown in FIG. 3C:

Packet loss 502-L may refer and/or include any of the following: A resource packet loss 504 for the responsive resource 600. A link packet loss 506 to the first responsive resource 600-1 through the link 602 to the second responsive resource 600-2. A message packet loss 524.

Latency 502-L may refer and/or include any of the following: A resource latency 508 for the responsive resource. A unidirectional latency 510 to the first responsive resource through the link to the second responsive resource. A bidirectional latency 512 between the first responsive resource through the link to the second responsive resource. A message latency 526.

Jitter 502-J may refer and/or include any of the following: A latency jitter 514 as a variance of the latency, A unidirectional latency jitter 516 as the variance of the unidirectional latency. A bidirectional latency jitter 518 as the variance of the bidirectional latency. A message latency jitter 528.

A link utilization capacity 520 of the link.

And/or a resource utilization capacity 522 of the resource.

As used herein any and/or all of these jitter terms may be calculated based upon a variety of statistical and heuristic procedures which include but are not limited to the average of the difference between the maximum and minimum of the estimated network parameter;

the statistical variance of the estimated network parameter;

a windowed version of one of the above; and a weighted moving average of one of the above.

The network management zone 300 may further and preferably include each responsive resource 600 which can respond 622 to the request 622.

Figure 2D:
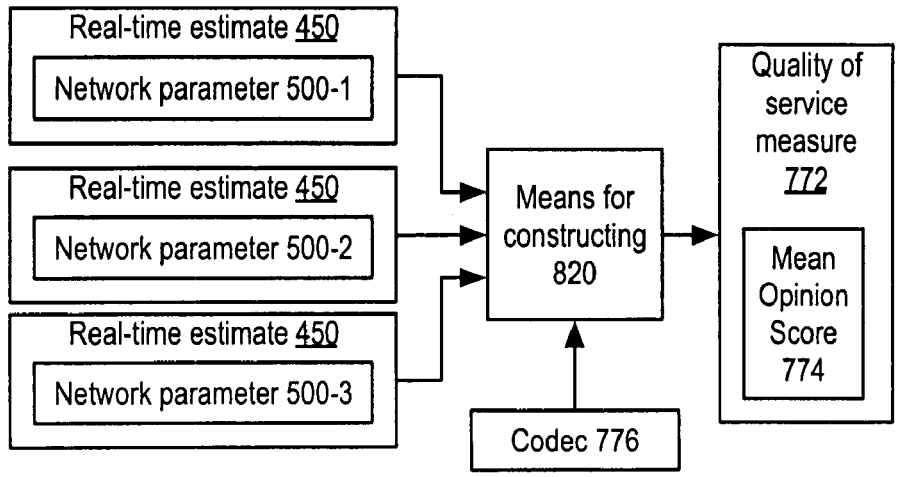
Figure 15:
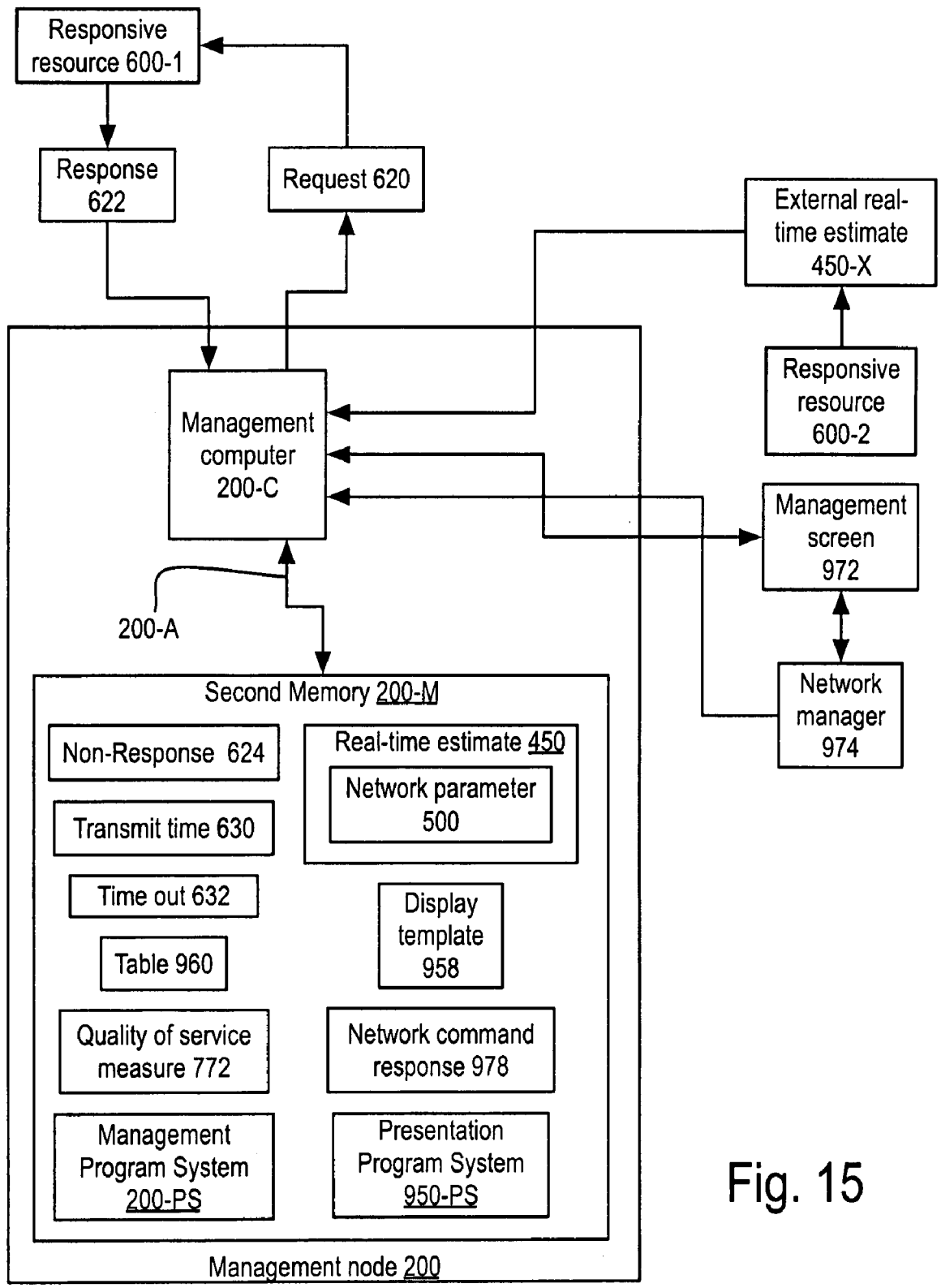
FIG. 15 shows the management node including an instance of a computer implementing at least part of each member of the means group of FIG. 13B.
Figure 16A:
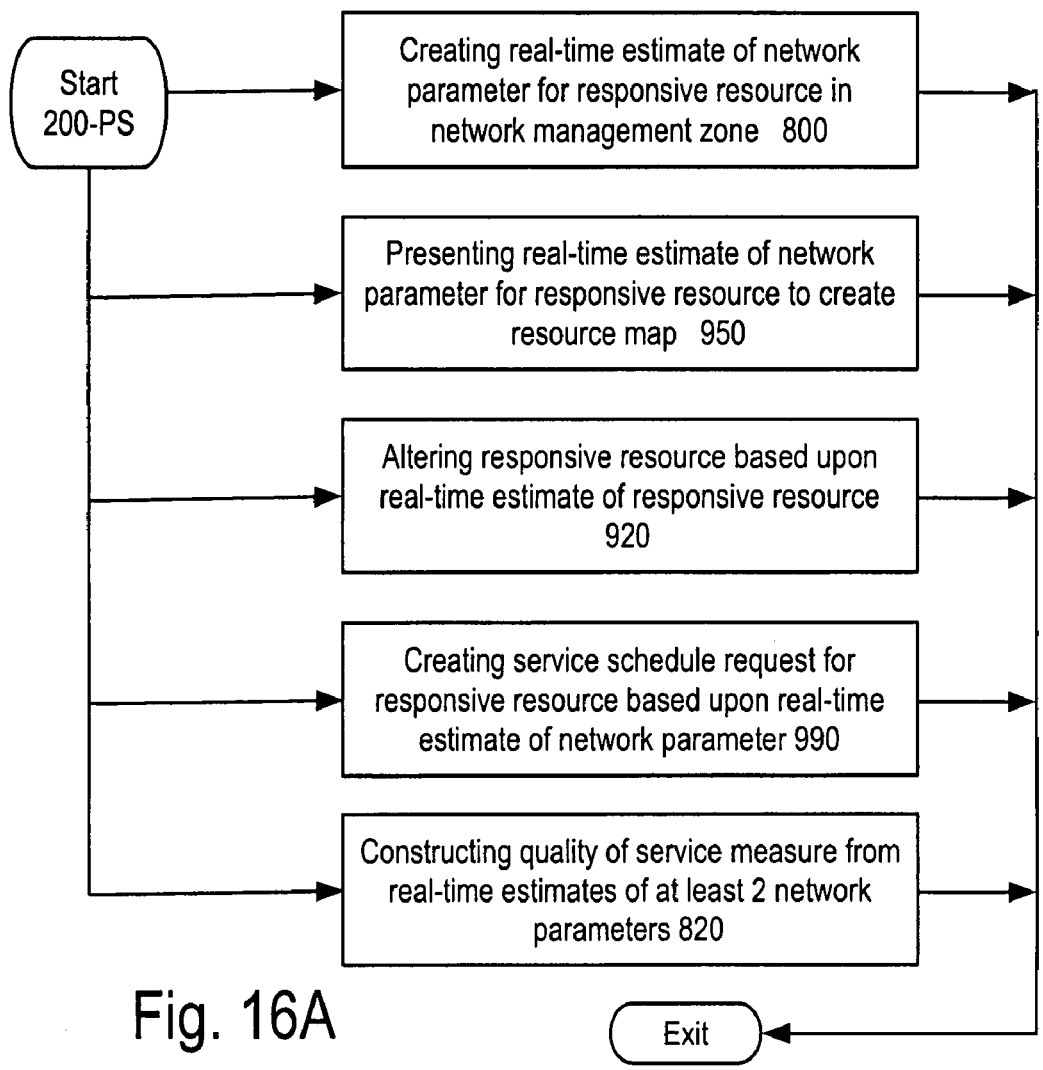
FIG. 16A shows the management program system of FIG. 15 implementing at least part of each member of the means group of FIG. 13B.

The invention includes the real-time estimate 450 of the network parameter 500 as a product of the invention's process of observing the responsive resource 600 to at least one request 620 in the management protocol 700 as shown in the preceding Figures and discussed above. The invention's method includes constructing 820 a quality of service measure 772 using the real-time estimate of at least two network parameters, as shown in FIGS. 2C, 2D, 15 and 16A. Various implementations of the method may include means for constructing 820, which may be included in the management node 200 as shown in FIGS. 15 and 16A, or may not be included in the network management zone. The invention includes the quality of service measure as a product of this process. The quality of service measure may further be constructed by using real-time estimates of more than two network parameters as shown in FIG. 2D. It may further be constructed using a codec 776. The quality of service measure may include a Mean Opinion Score 774. Alternatively, the quality of service measure may be the Mean Opinion Score.

The network management zone 300 may further and preferably include at least one management node 200 sending 810 the request 620 to at least one responsive node 600 included in the network management zone. The management node may further receive 812 the response 622 to the request from the responsive node 600.

Figure 4A:
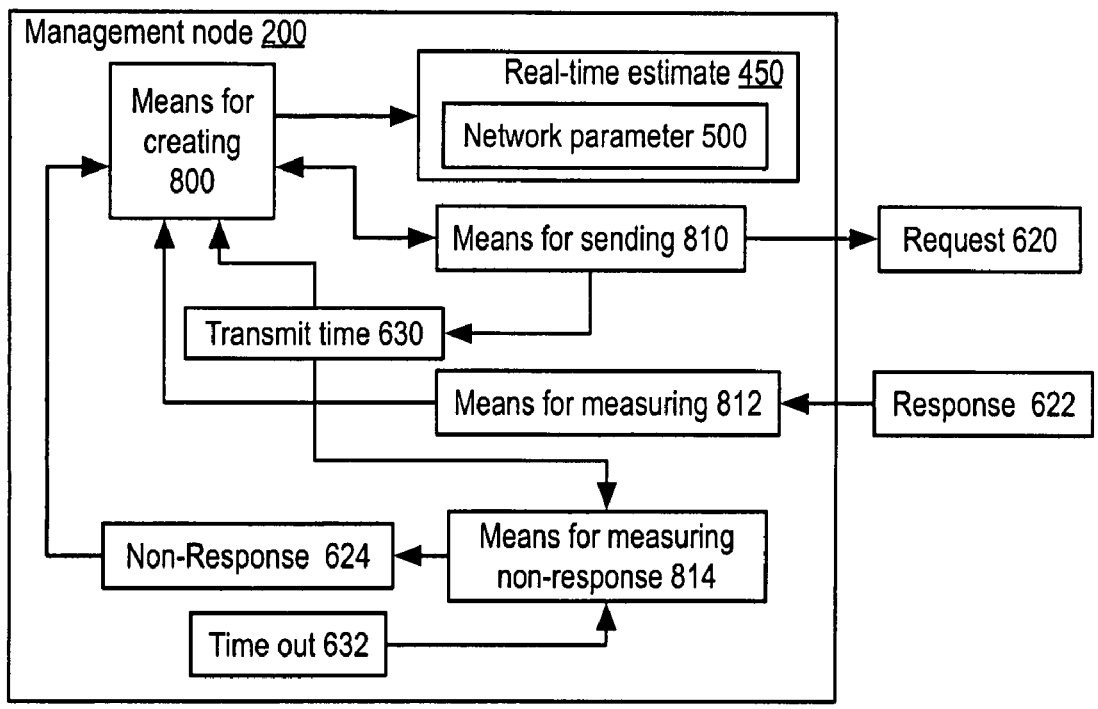
FIG. 4A shows some details of the management node of FIGS. 1A and 2A for creating the real-time estimate of the network parameter.

The invention includes the management node 200 implementing the method of observing the network management zone 300 is shown in FIG. 4A including means for creating 800 the real-time estimate 450 of the at least one network parameter 500 for the at least one responsive resource 600 to the management protocol 700 in the network management zone, which may further include means for sending 810 the request in the management protocol to the responsive resource at the transmission time 630, means for measuring 812 the response to the request from the responsive resource based upon the transmission time to contribute to the real-time estimate of the network parameter, and means for measuring 814 the non-response 624 to the request after the time-out 632 after the transmission time.

The request 620 may optionally be a request for the responsive resource's system time. The system clocks of the management node 200 and the responsive resource 600 are preferably synchronized, so the unidirectional latency 510 can be calculated by subtracting the return trip time from the bidirectional latency 518.

The trace routes to these responsive resources are regularly computed. The number of hops are counted, and the latency between the hops is tracked.

Figure 6A:
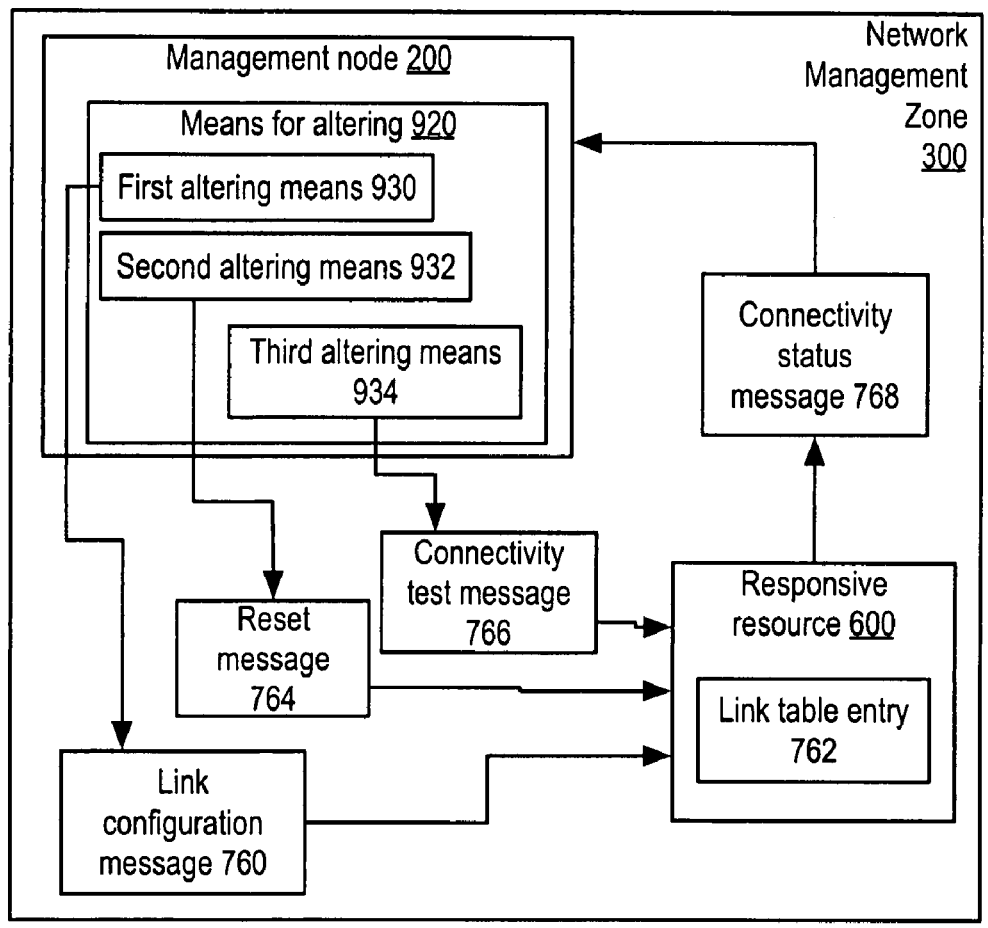
FIG. 6A shows further details of the means for altering of FIG. 5B.
Figure 6B:
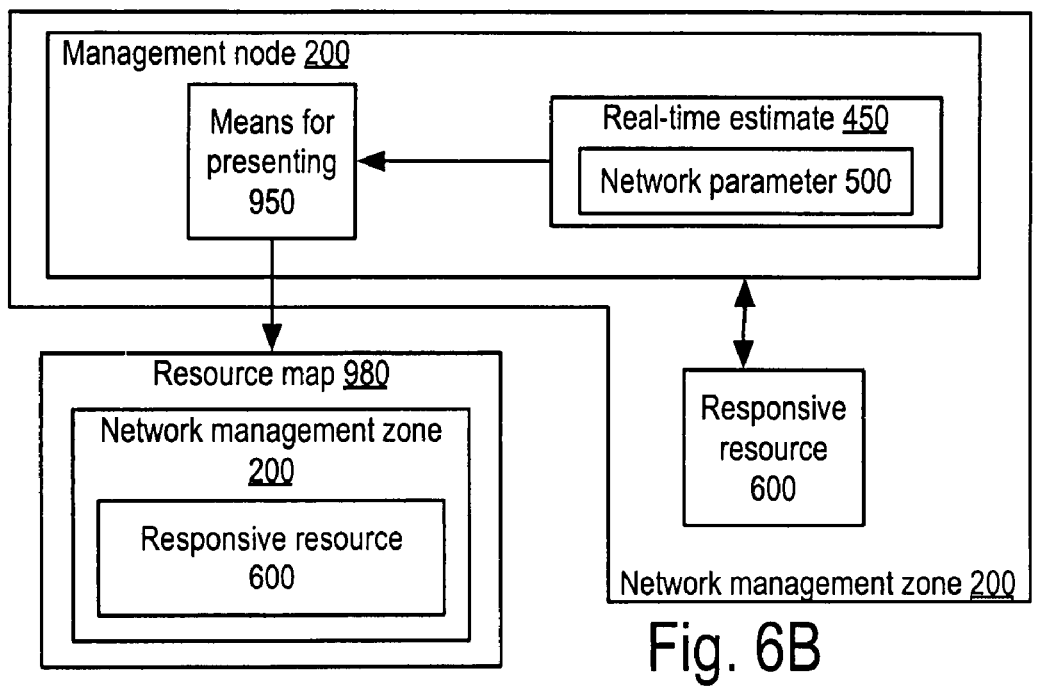
FIG. 6B shows the management node including a means for presenting the real-time estimate of the network parameter to create a resource map of the network management zone.
Figure 12A:
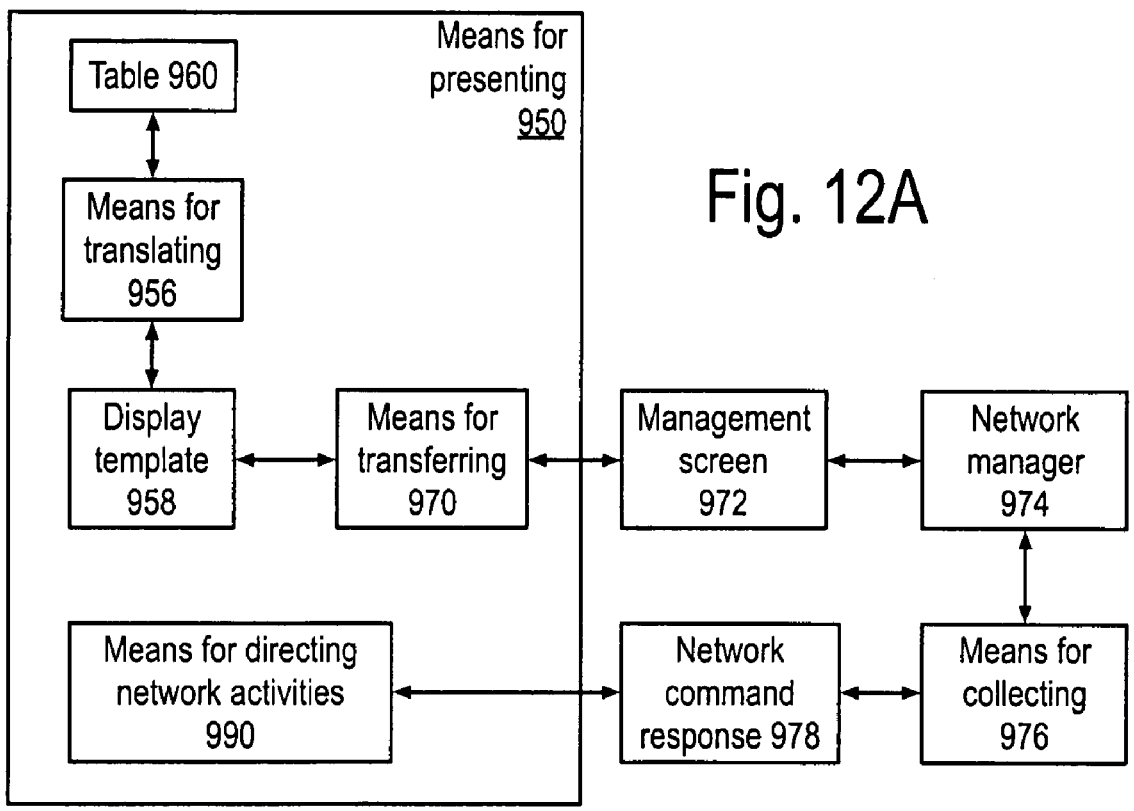

Reports are viewable as on the resource map 980 of FIG. 6B and/or using the display template 958 presented to the management screen 972 of FIG. 12A for latency changes of interim hops, and changes in routes that would affect the hop count of packets reaching the destination.

Figure 4B:
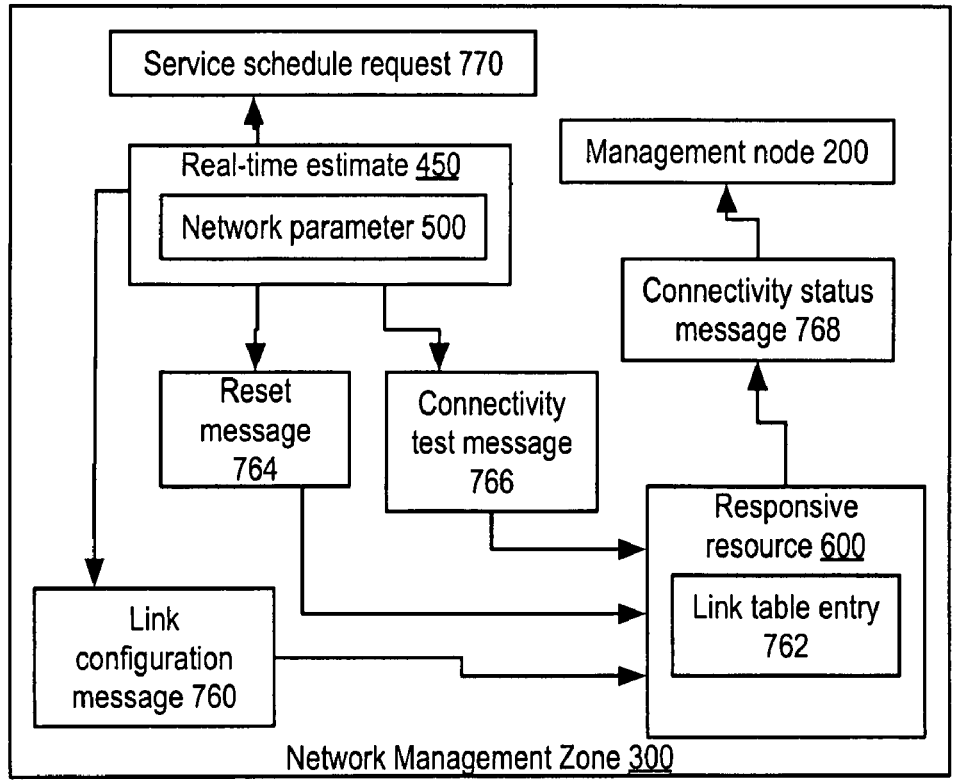
FIG. 4B shows the operation within the network management zone using the real-time estimate of the network parameter to create service schedule requests and/or send messages to the responsive resource to configure links, reset the responsive resource and/or test connectivity.

The invention's method may further include altering at least one responsive resource 600 based upon the real-time estimate 450 of the at least one network parameter 500 and/or creating a service schedule request 770 for the responsive resource based upon at least one of the estimates of the network parameter as shown in FIG. 4B.

Altering the responsive resource 600 may include sending a link configuration message 760 to the responsive resource to create a link table entry 762 in the responsive resource, sending a reset message 764 to the responsive resource to reset the responsive resource, and/or sending a connectivity test message 766 to the responsive resource to create a connectivity status message 768 sent from the responsive resource to the management node 200.

Figure 5A:
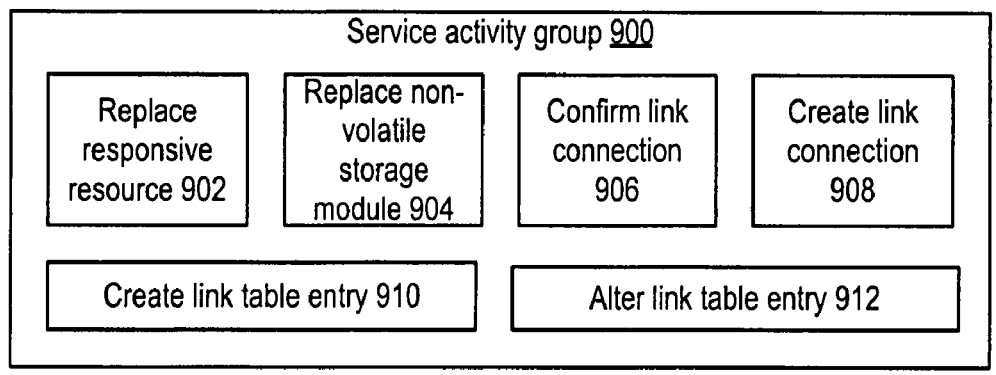
FIG. 5A shows the members of the service activity group which may be included in the service schedule requests of FIG. 4B.

The service schedule request 770 may include at least one member of the service activity group 900 as shown in FIG. 5A. The service activity group consists of replace responsive resource 902, replace non-volatile storage module 904 included in the responsive resource 600, confirm a link 906 for the responsive resource, create the link 908 for the responsive resource, create a link table entry 910 for the link 602 of the first responsive resource 600-1 as shown in FIG. 2A, and alter 912 the link table entry 762 as shown in FIG. 4B for the link in the responsive resource.

Figure 5B:
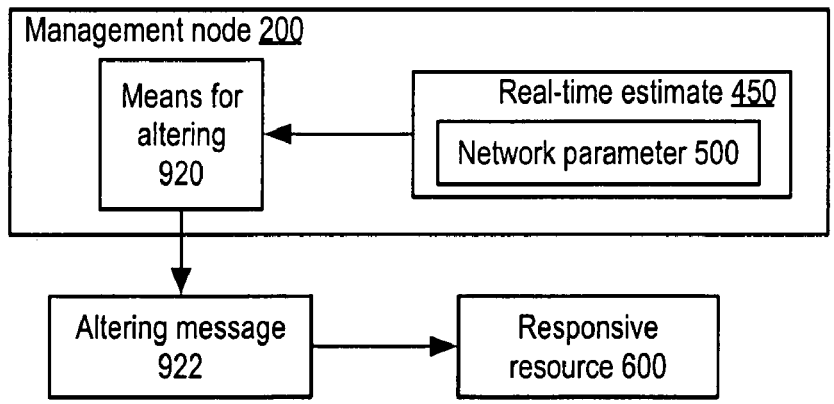
FIG. 5B shows the management node include a means for altering the responsive resource by sending an altering message, based upon the real-time estimate of the network parameter.

The management node 200 may further include means for altering 920 at least one responsive resource 600 based upon the real-time estimate 450 of at least one network parameter 500 for the responsive resource by sending at least one member of the altering message group 930 to the responsive resource as shown in FIG. 5B. As used herein a member of the altering message group will be referred to as an altering message 922.

Figure 5C:
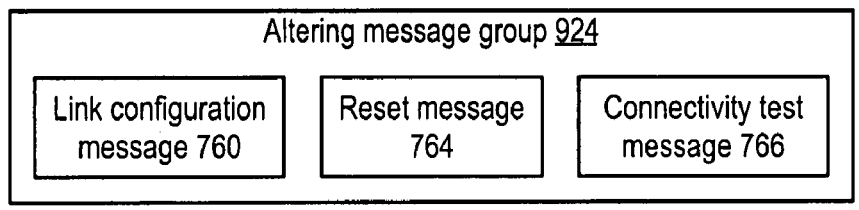
FIG. 5C show the altering message group to which the altering message of FIG. 5B may preferably be a member.

As used herein, the altering message group 924 consists of the members: the link configuration message 760, the reset message 764, and the connectivity test message 766 as shown in FIG. 5C.

The means for altering 920 may include any combination of the following a first altering means 930 for sending the link configuration message 760 to the responsive resource 600 to create a link table entry 762 in the responsive resource, a second altering means 932 for sending the reset message 764 to the responsive resource to reset the responsive resource, and a third altering means 766 for sending the connectivity test message 766 to the responsive resource to create the connectivity status message 768 sent from the responsive resource to the management node 200, as shown in FIG. 6A.

In certain embodiments, at least one member of the altering message group is compatible with a version of the Internet Control Management Protocol (ICMP).

The management node may 200 include means for presenting 950 the real-time estimate 450 of at least one network parameter 500 for at least one responsive resource 600 to create a resource map 980 of the network management zone 200 as shown in FIG. 6B.

The resource map 980 may include daily network "Weather Report" which may be preferably emailed to users to help them keep track of the health of the network. Users may not have to login to the management node 200 to get these reports. They may be customizable, allowing the addition of a company's logo or other custom information. Links on a report may allow users to connect to the web page to analyze and fix problems. Telnet links for each switch may allow users to check and change configurations. Users may keep/organize each report in an email system to maintain a history of the network's health. The resource map preferably provides network performance information on each responsive resource in the network management zone 200 so users can know which responsive resources are over-utilized, and which have too many errors.

The means for presenting 950 may include the following: A table 960 containing a real-time estimate 450 of the network parameter 500 for the responsive resource 600 at a time step 962, for at least one of the responsive resources, for at least one of the network parameters, and for at least two of the time steps.

Figure 7A:
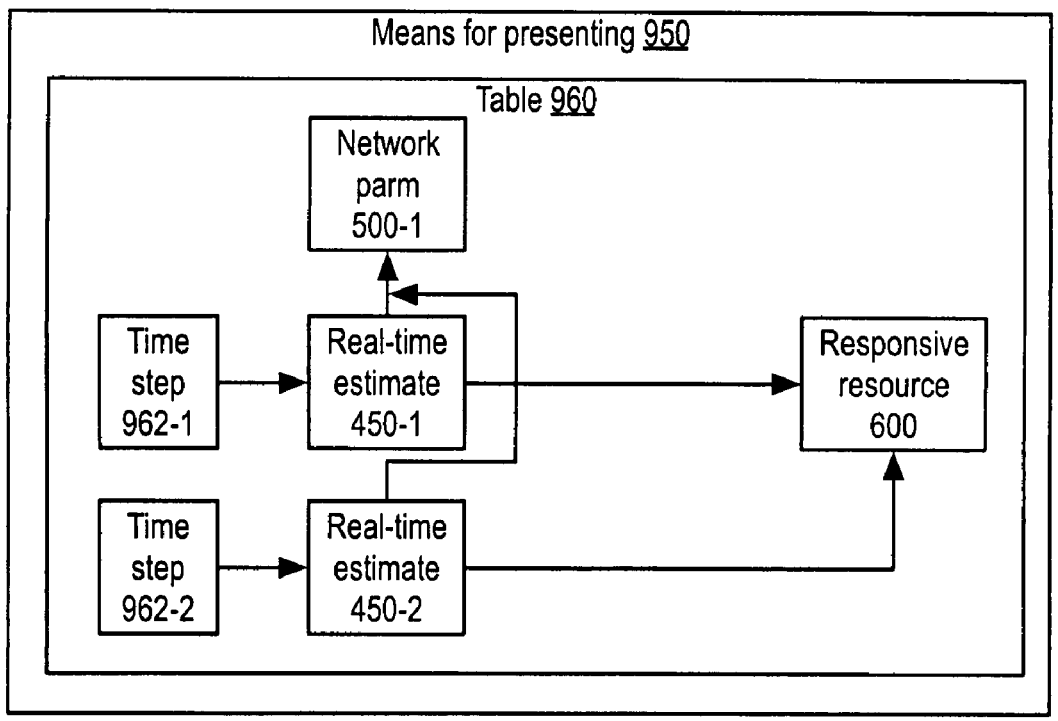
Figure 7B:
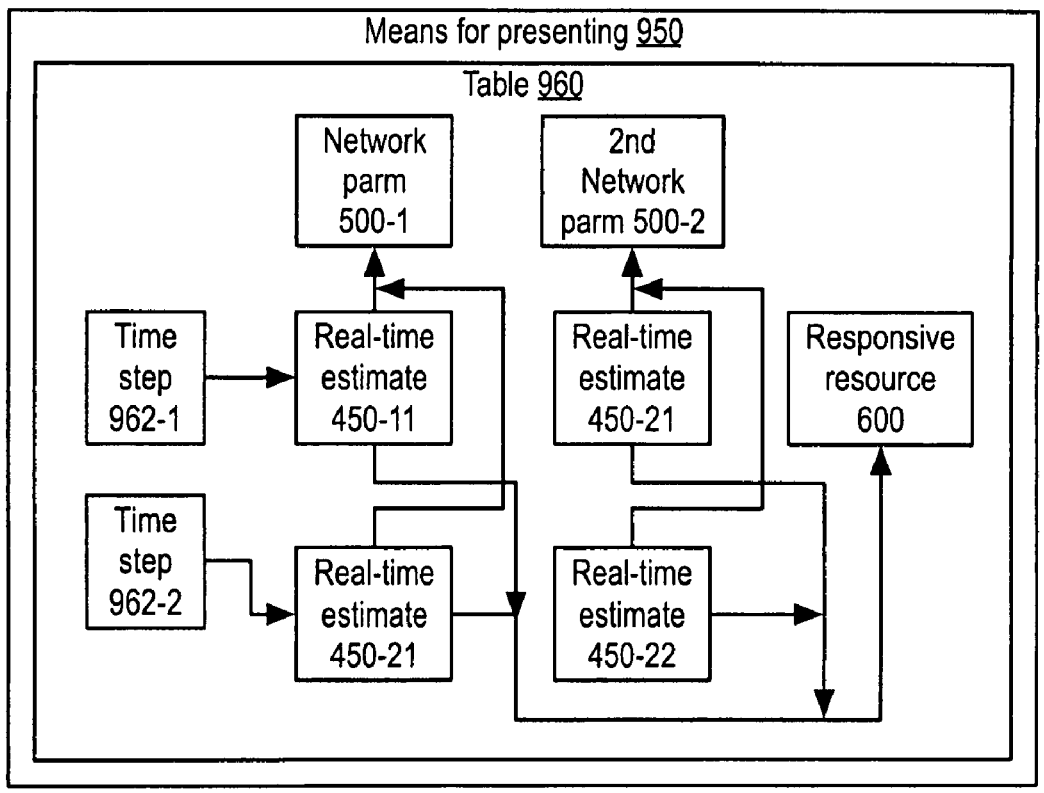

By way of example, FIGS. 7A and 7B show the table 960 including a first network parameter 500-1 which is estimated for two time steps, the first time step 962-1 and the second time step for the responsive resource 600, for exactly one responsive resource 600.

FIG. 7A shows the table including the first real-time estimate 450-1 at the first time step 962-1 and the second real-time estimate 450-2 at the second time step 962-2, both for the first network parameter 500-1.

FIG. 7B shows the table including the first-first real-time estimate 450-11 at the first time step 962-1 and the second-first real-time estimate 450-21 at the second time step 962-2, both for the first network parameter 500-1.

FIG. 7B further shows the table including the second-first real-time estimate 450-21 at the first time step 962-1 and second-second real-time estimate 450-22 at the second time step 962-2, both for the first network parameter 500-1.

FIGS. 8A to 8C show further examples of the table 960 including real-time estimates for two responsive resources and two or more network parameters at two or more time steps. The responsive resources of these Figure will be referred to as the first responsive resource 600-1 and the second responsive resource 600-2. The network parameters will be referred to as the first network parameter 500-1, the second network parameter 500-2 and the first network parameter 500-3.

As used herein, the real-time estimate 450 of the K-th responsive resource 600-K for the L-th network parameter 600-L at the M-th time step 962-M will be referred to as the Kth-Lth-Mth real-time estimate 450-KLM. The following are examples of this notation as used in FIGS. 8A to 8C:

The real-time estimate 450 for the first responsive resource 600-1 of the first network parameter 600-1 at the first time step 962-1 will be referred to as the first-first-first real-time estimate 450-111.

Similarly, the real-time estimate 450 for the first responsive resource 600-1 of the first network parameter 600-1 at the second time step 962-2 will be referred to as the first-first-second real-time estimate 450-112.

Similarly, the real-time estimate 450 of the first responsive resource 600-1 for the second network parameter 600-2 at the third time step 962-3 will be referred to as the first-second-third real-time estimate 450-123.

Similarly, the real-time estimate 450 of the second responsive resource 600-2 for the first network parameter 600-1 at the third time step 962-3 will be referred to as the second-first-third real-time estimate 450-213.

The table 960 may or may not include real-time estimates for differing responsive resources 600 on the same time step 962.

FIGS. 8A and 8B shows examples of the table including real-time estimates for both the first responsive resource 300-1 and the second responsive resource 600-2 for each of the time steps included in the table.

FIG. 8C shows the real-time estimates for the first responsive resource for each of the time steps included in the table, but only includes real-time estimates for the second responsive resource for the second time step 962-2 and the third time step 962-3, but not the first time step 962-1.

Similarly, the real-time estimates included in the table for one responsive resource may or may not include all network parameters at each time step.

Figure 9:
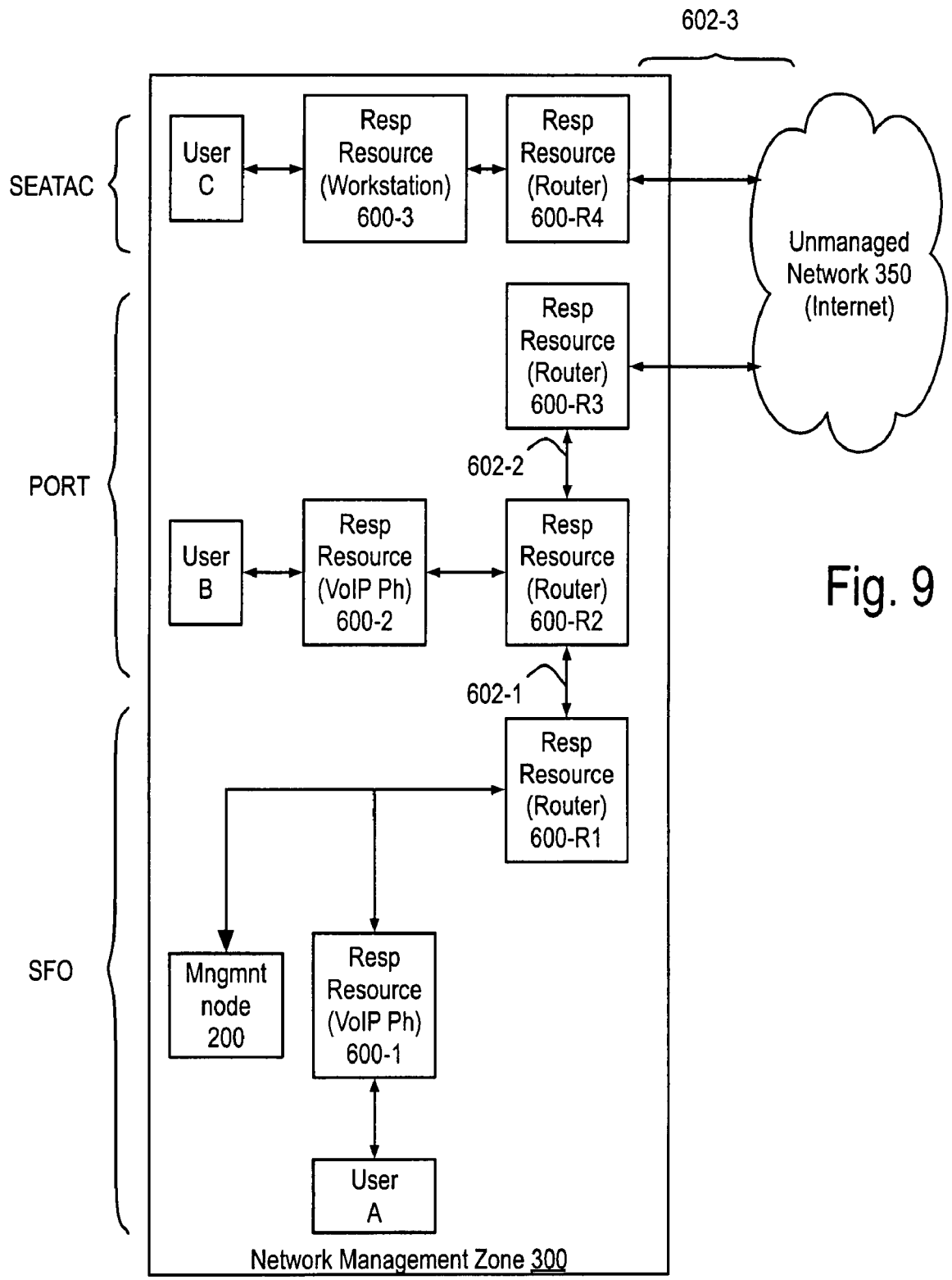
FIGS. 9 and 10 show examples of network management zones.
Figure 10:
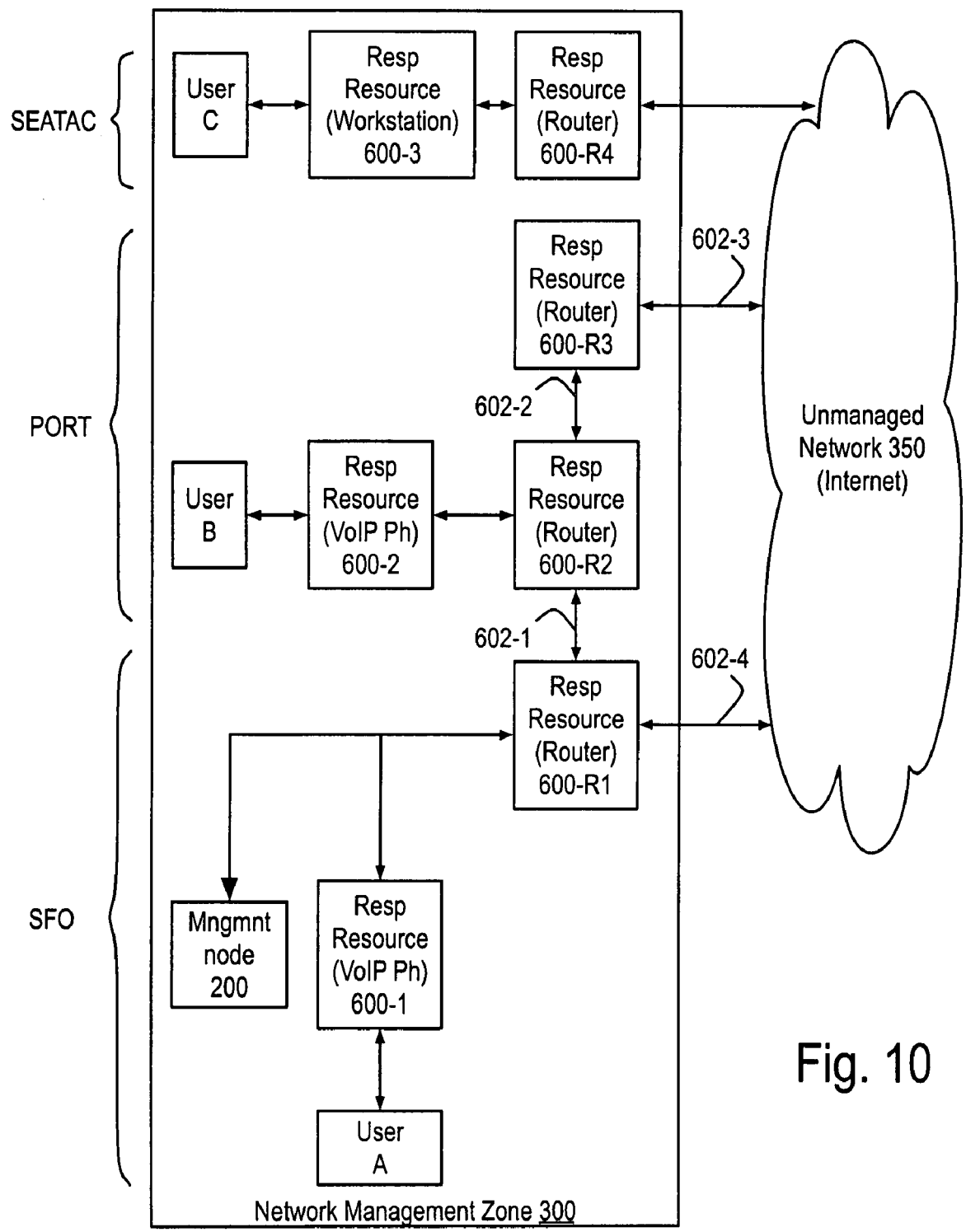

FIGS. 9 and 10 show examples of the network management zone 300 including four routers, which will be referred to herein as the first router 600-R1, the second router 600-R2, the third router 600-R3 and the fourth router 600-R4. A first link 602-1 communicatively couples the first router to the second router. A second link 602-2 communicatively couples the second router to the third router. A third link 602-3 communicatively couples the third router to the fourth router, except this link crosses an unmanaged network 350 whose network parameters cannot be controlled, which will frequently be a version of the Internet.

FIG. 10 further shows a fourth link 602-4 from the first router 600-R1 through the unmanaged network 350 to the fourth router 600-R4.

In these examples, assume that the first router 600-R1, the first VoIP phone 600-1, the first user A, and the management node 200 are located near San Francisco SFO. The second router 600-R2, the second VoIP Phone 600-2, the second user B, the second link 602-2 and the third router 600-R3 are located near Portland PORT. The third user C, a workstation responsive resource 600-3 and a fourth router 600-R4 are located near Seattle SEATAC.

Further assume that the first VoIP phone 600-1, the second VoIP phone 600-2 and the workstation responsive resource 600-3 are considered completely dedicated to Voice over IP calls when active and will not be considered in terms of network parameters.

Frequently, the unmanaged network 350 supports a standard protocol, such as the Internet Protocol.

Consider a network parameter 500, the resource latency 508. The following table 960 shows an example of the resource latency for the example network management zone 300 of FIG. 9:

TABLE ONE

Example of real time estimates included in the example table 960 of an estimated parameter 500 of the network management zone 300 of FIG. 9.

| Source node | Destination node | Real time estimate of Resource latency (milliseconds) |
|---|---|---|
| Management node 200 | First router 600-R1 | 5 |
| Management node 200 | Second router 600-R2 | 55 |
| Management node 200 | Third router 600-R3 | 60 |
| Management node 200 | Fourth router 600-R4 | 160 |

From these estimates, the following real-time estimates can be derived and may be included in a preferred embodiment of the table 960:

TABLE TWO further real-time estimates derived from the examples of Table One.

| Source node | Destination node | Real time estimate of Resource latency (milliseconds) |
|---|---|---|
| First router 600-R1 | Second router 600-R2 | 50 |
| Second router 600-R2 | Third router 600-R3 | 5 |
| Third router 600-R3 | Fourth router 600-R4 | 100 |

Based upon these examples of the real-time estimate 450 for the network parameter 500 of the resource latency 508, the following estimates of latency can be derived for VoIP phone calls:

TABLE THREE examples of VoIP phone call latency estimates based upon the real-time estimates shown in the preceding two Tables.

| First User | Second user | Real time estimate of VoIP latency (milliseconds) |
|---|---|---|
| User A | User B | 50 |
| User B | User C | 100 |
| User A | User C | 150 |

In certain embodiments some of the latencies in Tables One to Three may be referred to by the network parameter 500 known herein as the unidirectional latency 510 and/or the bidirectional latency 512, rather than the resource latency 508, of FIG. 3C.

Figure 11A:
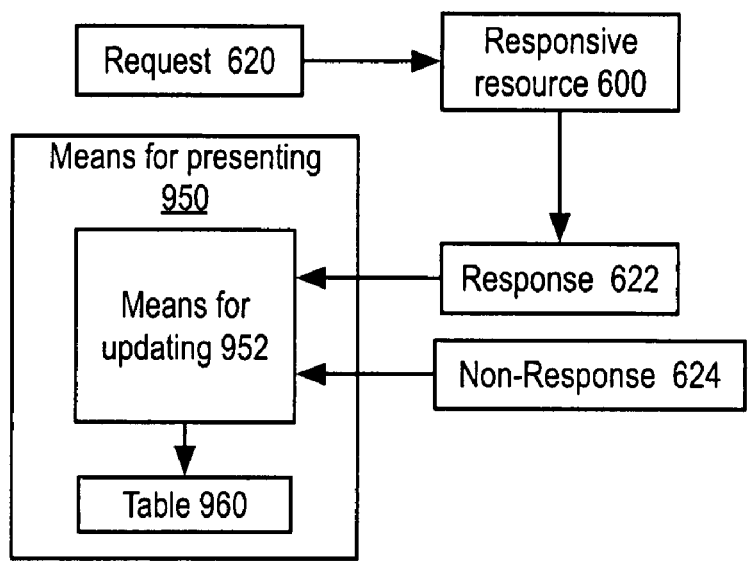
Figure 11B:
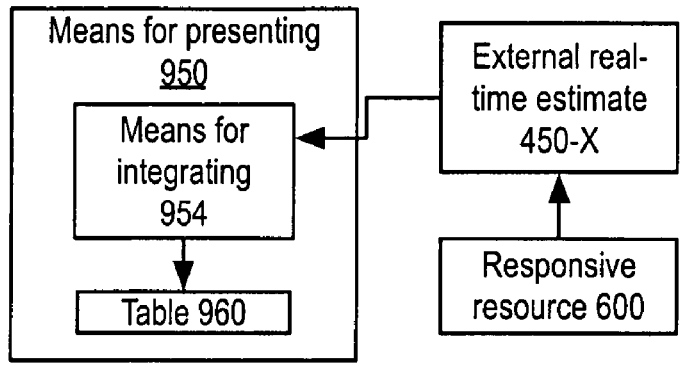
Figure 11C:
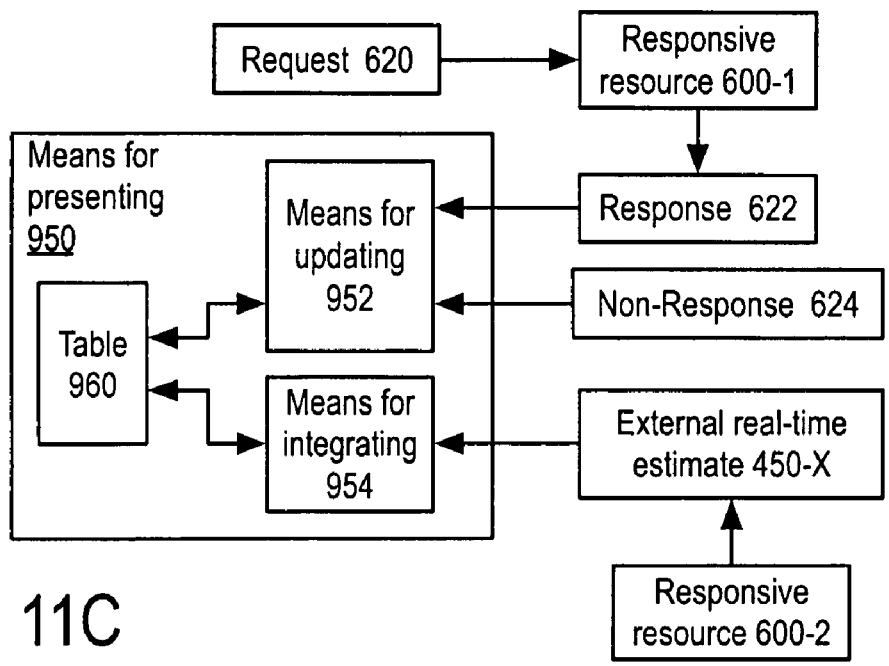

The means for presenting 950 may further include any combination of the following as shown in FIGS. 11A to 11C:

Means for updating 952 the table 960 based upon at least one member of the response group consisting of: the response 622 and the non-response 624, both to the request 620 to the responsive resource 600 as shown in FIG. 11A.

Means for integrating 954 the table 960 with an external real-time estimate 450-X received from the responsive resource 600, for at least one network parameter 500 and at least one responsive resource 600 as shown in FIG. 11B.

The means for presenting 950 may include both the means for updating 952 using the response 622 and/or the non-response 624 of the request 620 sent to a first responsive resource 600-1 and further include the means for integrating 954 receiving an external real-time estimate 450-X received from a second responsive resource 600-2.

In certain embodiments of the invention the first and the second responsive resources may be essentially the same.

At least two of the responsive resources may interact with the means for updating 952 and/or at least two responsive resources may send an external real-time estimate 450-X to the means for integrating 954, in certain embodiments of the invention.

The means for presenting 950 may further include means for translating 956 the table 960 to a display template 958, means for transferring 970 the display template to a management screen 972 presented to a network manager 974, means for collecting 976 at least one network command response 978 from the network manager based upon the management screen presenting the display template, and means for directing network activities 990 based upon the network command response as shown in FIG. 12A.

The means for directing network activities 990 may include a first means for posting 992-1 a first service request 994-1 for at least one responsive resource 600, a second means for posting 992-2 a second service request 994-2 for a link 602 between a first responsive resource 600-1 and a second responsive resource 600-2, and/or a third means for posting 992-3 a control message request 978 to the means for altering 922 at least one of the responsive resources.

Figure 12B:
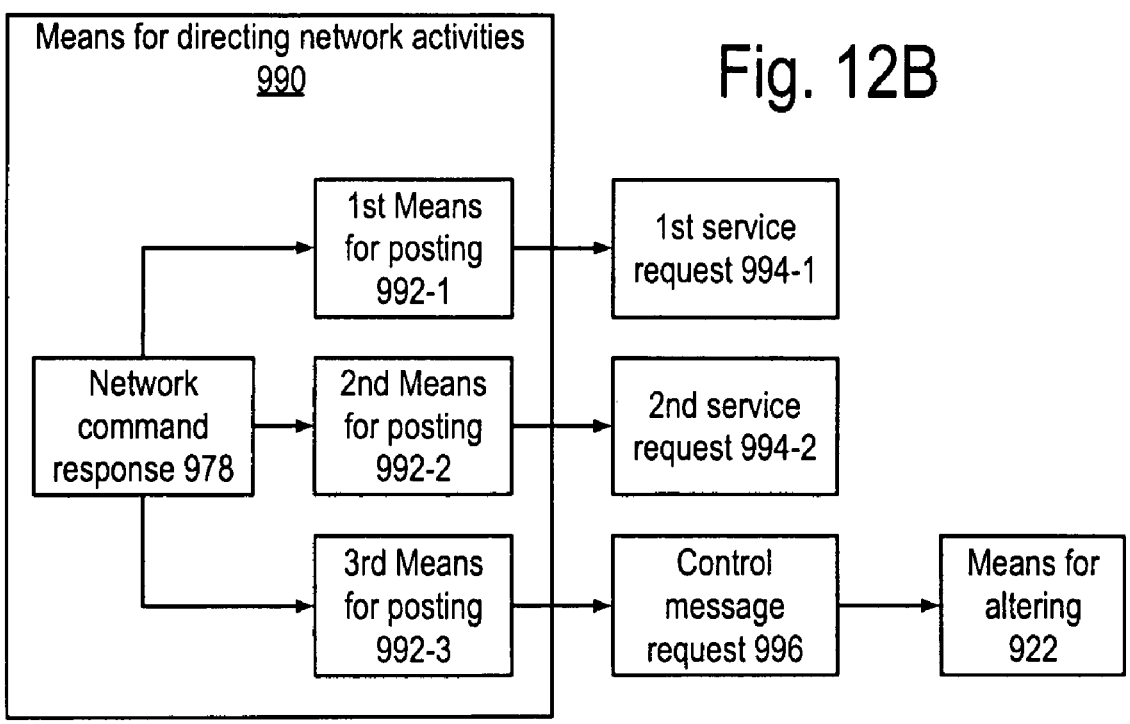

In certain preferred embodiments, the means for directing network activities 990 may include the network command response 978 from the network manager 974 stimulating at least one of the first means for posting 992-1, the second means for posting 992-2, and/or the third means for posting 992-3, as further shown in FIG. 12B.

The means for directing network activities 990 may further include a first means for tracking 998-1 the first service request 994-1 for the responsive resource 600, a second means for tracking 998-2 the second service request 994-2 for the link 602 between the first responsive resource 600-1 and the second responsive resource 600-2, and a third means for tracking 998-3 the control message request 996 to the means for altering 922 the responsive resource, as shown in FIG. 13A.

In certain embodiments, the service schedule request 770 of FIG. 4A may include the first service request 994-1 and/or the second service request 994-2.

Users are enabled to securely access the network performance information wherever they are by using the display template 958 with a Web browser, PocketPC, or Cellphone. Teleworking from a remote site is enabled with a low-bandwidth optimized user interface. All features that are available via the web interface are available on a PocketPC web interface. The invention provides users with the ability to resolve problems rapidly while still in the field.

Alerts may be issued if latency, jitter, or packet losses rise above specified thresholds, or if the MOS calculated with a specific codec is too low for a specific monitored device. The alert could be in the form of an email, syslog message, SMS message, instant message, SNMP trap, or other alert mechanism.

In certain embodiments, the means for directing network activities 990 may include a Network Prescription function leading to a healthier network. Each user presentation displays on the management screen 972 prescriptive information to suggest ways to improve performance and reduce errors. This preferably allows users to see the current utilization of any responsive resource 600. If someone needs to know if the network is experiencing a slowdown, they can look at current link saturation rates and determine if link is unusually slow. Users are enabled to search through all of a responsive resource's ARP caches to convert an IP address to a MAC address, and then search for the MAC address on all of the switch ports to locate the individual port where the device is connected.

At least one member of the means group 200-G of FIG. 13B of the management node 200 may include at least one instance of at least one of the following: a computer accessibly coupled to a memory and directed by a program system including at least one program step residing in the memory, a finite state machine FSM and an inferential engine IE.

As used herein, the means group consists of: means for creating 800, means for sending 810, means for measuring 812 the response 622, the means for measuring the non-response 814, the means for constructing 820, the means for altering 920, and the means for presenting 950.

Figure 14:
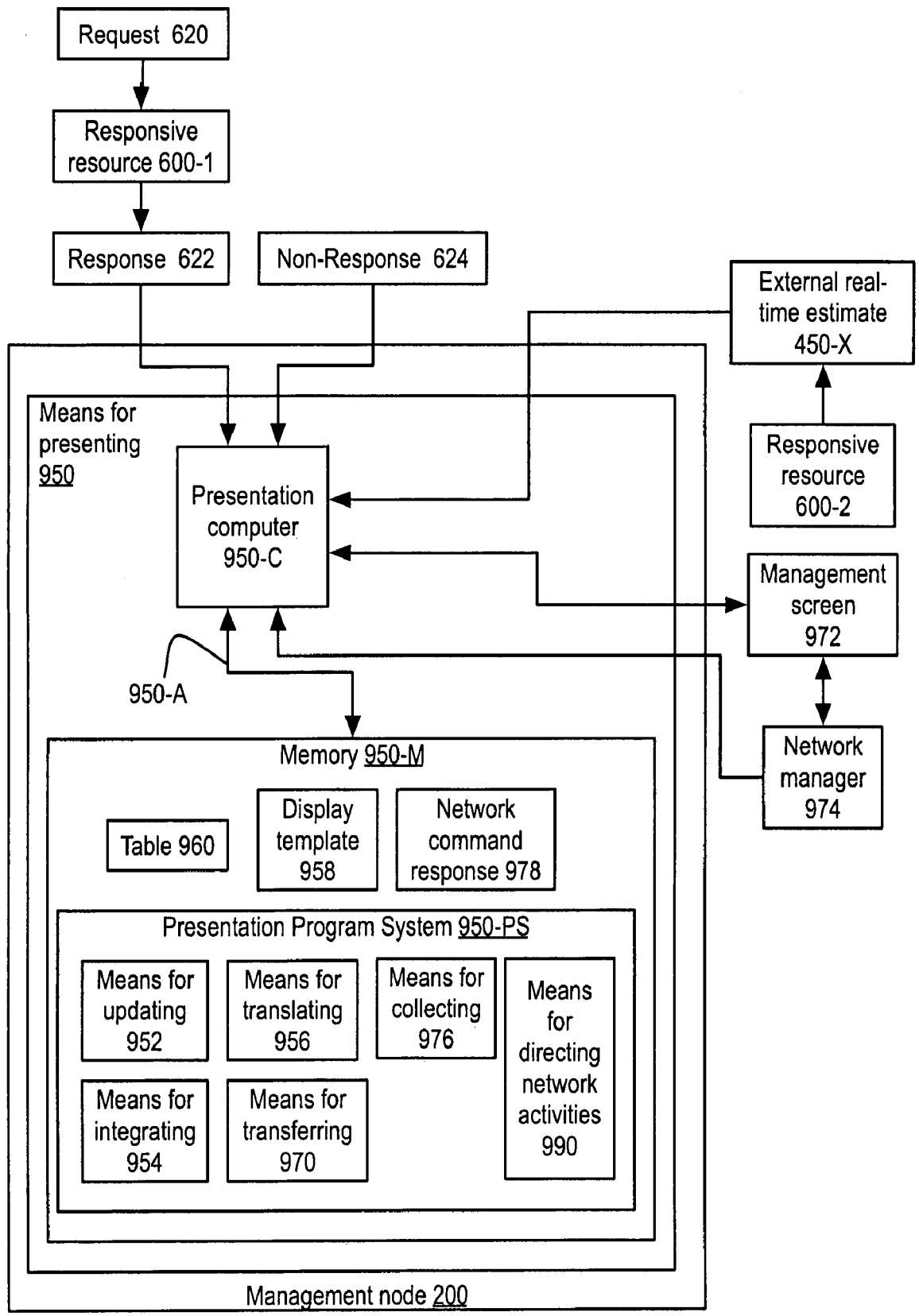
FIG. 14 shows the means for presenting including an instance of a computer.

By way of example, FIG. 13C shows the means for creating 800 including an instance of a finite state machine FSM. FIG. 13D shows the means for altering 920 including an instance of an inference engine IE. FIG. 14 shows the means for presentation 950 including a presentation computer 950-C accessibly coupled 950-A to a presentation memory 950-M.

As used herein, a computer includes at least one instruction processor and at least one data processor, where each of the data processors is at least partly directed by at least one of the instruction processors.

The memory 950-M may preferably include the table 960, the display template 956 and the network response command 978 received by the presentation computer 950-C from the means for collecting 976 the response of the network manager 974, based upon the presentation computer sending the display template to the management screen.

The presentation computer 950-C of FIG. 14 may preferably be directed by a presentation program system 950-PS including at least part of the implementation of at least one the following using at least one program step residing in the memory:

The means for updating 952 the table 960 based upon the response 622 and/or the non-response 624 of the first responsive resource 600-1 to the request 620.

The means for integrating 954 the external real-time estimate 450-X from the second responsive resource 600-2 into the table 960.

The means for translating 956 the table 960 into the display template 958.

The means for transferring the display template 958 to the management screen 972 for presentation to the network manager 974.

The means for collecting 976 the network command response from the network manager 974 based upon the presentation of the display template 958 by the management screen 972.

And the means for directing network activities 990, possibly based upon the network command response 978.

Alternatively, the management node may preferably include a management computer 200-C second accessibly coupled 200-A to a second memory 200-M as shown in FIG. 15. The management computer may send the request 620 to the first responsive resource 600-1 at the transmit time 630. The response 622 may be received within the time out 632 after the transmit time, or alternatively, a time out 632 may be created, preferably in the second memory. Receiving the response or creating the time out may be used to create the real-time estimate 450 of the network parameter 500, which may reside in the second memory.

Consider the following example, a VoIP phone 680 may establish a call with another VoIP phone. During this call, the phone would monitor the packets received from the other phone and keep track of the latency 524, latency jitter 514, packet loss 504 or 506, and overall number of out-of-order packets 526 that arrived.

The VoIP phone 680 may have a setting for a monitoring interval. The monitoring interval would be set by default to 5 seconds. The monitoring interval in the phone could be set by the user, the PBX, or a single network management station.

The VoIP phone 680 may monitor the call and tally the peak latency, peak jitter, and peak packet loss, and peak out-of-order arrivals seen during any monitoring interval for the entire call. Each peak would also have a timestamp of when that peak was encountered.

At the end of the call, the VoIP phone 680 might send the following information to a management node 200: codec used, monitoring interval, average latency, average jitter, overall packet loss, overall out-of-order packets, peak latency and timestamp, peak jitter and timestamp, peak packet loss and timestamp, and peak out-of-order packets and timestamp. This constitutes an example of an external real-time estimate 450-X being sent from a responsive resource 600, in this case, the VoIP phone.

The VoIP phone 680 may have a setting for the number of Peak values to store and return to the management node 200. The number of Peak values would be set by default to 5. The number of Peak values stored in the phone could be set by the user, the PBX, or management node.

The management node 200 may monitor all of the network links 602 within the network management zone 300 for link utilization capacity 520, bidirectional latency 512, unidirectional latency 510, jitter, and packet loss. It would be able to correlate the exact time of the poor call quality with the performance of the network links at that time.

By way of example, the management node 200 may incorporate a webserver that could accept the XML call detail record information from a VoIP phone 680 that initiated a call and would store this information in a database as at least one external real-time estimate 450-X. The management node preferably monitors network performance and uses the call detail record information to update the table 960. A user could then look up their call, and the quality of their call, learn the reason for the poor call quality (jitter, latency, or packet loss), and also look at the network performance at the exact time of the quality loss.

FIG. 16A shows a flowchart of the invention's method and possesses arrows. These arrows will signify of flow of control and sometimes data, supporting implementations including at least one program step or program thread executing upon a computer, inferential links in an inferential engine, and state transitions in a finite state machine.

The step of starting a flowchart refers to at least one of the following and is denoted by an oval with the text "Start" in it. Entering a subroutine in a macro instruction sequence in a computer. Entering into a deeper node of an inferential graph. And directing a state transition in a finite state machine, possibly while pushing a return state.

The step of termination in a flowchart refers to at least one of the following and is denoted by an oval with the text "Exit" in it. The completion of those steps, which may result in a subroutine return, traversal of a higher node in an inferential graph, and popping of a previously stored state in a finite state machine.

A step in a flowchart refers to at least one of the following. The instruction processor responds to the step as a program step to control the data execution unit in at least partly implementing the step. The inferential engine responds to the step as nodes and transitions within an inferential graph based upon and modifying a inference database in at least partly implementing the step. The neural network responds to the step as stimulus in at least partly implementing the step. The finite state machine responds to the step as at least one member of a finite state collection comprising a state and a state transition, implementing at least part of the step.

The flowchart includes multiple steps. In certain aspects, any one of the steps may be found in an embodiment of the invention. In other aspects, multiple steps are needed in an embodiment of the invention. When multiple steps are needed, these steps may be performed concurrently, sequentially and/or in a combination of concurrent and sequential operations. The shapes of the arrows in multiple step flowcharts may differ from one flowchart to another, and are not to be construed as having intrinsic meaning in interpreting the concurrency of the steps.

The invention further includes a program system implementing the invention's method, known herein as the management program system 200-PS. containing program steps residing in a non-volatile memory component, preferably residing in the second memory 200-M. The program system includes at least one of the following program steps or operations shown in FIG. 16A:

Operation 800 supports creating the real-time estimate 450 of the at least one network parameter 500 for the at least one responsive resource 600 to the management protocol 700 in the network management zone 300. The operation may provide an implementation of at least part of the means for creating 800 as previously discussed.

Operation 950 supports presenting the real-time estimate 450 of the network parameter 500 for the responsive resource 600 to create a resource map 980 of the network management zone 300 as shown in FIG. 6B. Note that the resource map 980 may preferably be presented through the use of the display template 958 to a management screen 972 as shown in FIGS. 14 and 15. This operation may act as an interface to the presentation program system 200-PS and/or as an entry point to it. The operation may provide an implementation of at least part of the means for presenting 950.

Operation 920 supports altering at least one responsive resource 600 based upon the real-time estimate 450 of at least one network parameter 500 for at least one responsive resource 600. This operation may provide an implementation of at least part of the means for altering 920.

Operation 990 supports creating a service schedule request 770 for the responsive resource 600 based upon the real-time estimate 450 of at least one network parameter 500. This operation may provide an implementation of at least part of means for directing network activities 990.

The non-volatile memory component may include at least one instance of a semiconductor non-volatile memory component, a magnetic non-volatile memory component, an optical non-volatile memory component, and/or a ferroelectric non-volatile memory component.

The non-volatile memory component may preferably install the method through communicating with at least one computer, for example, the management computer 200-C and/or the presentation computer 950-C to create an installation of the program system in a memory accessibly coupled to the computer.

Figure 16B:
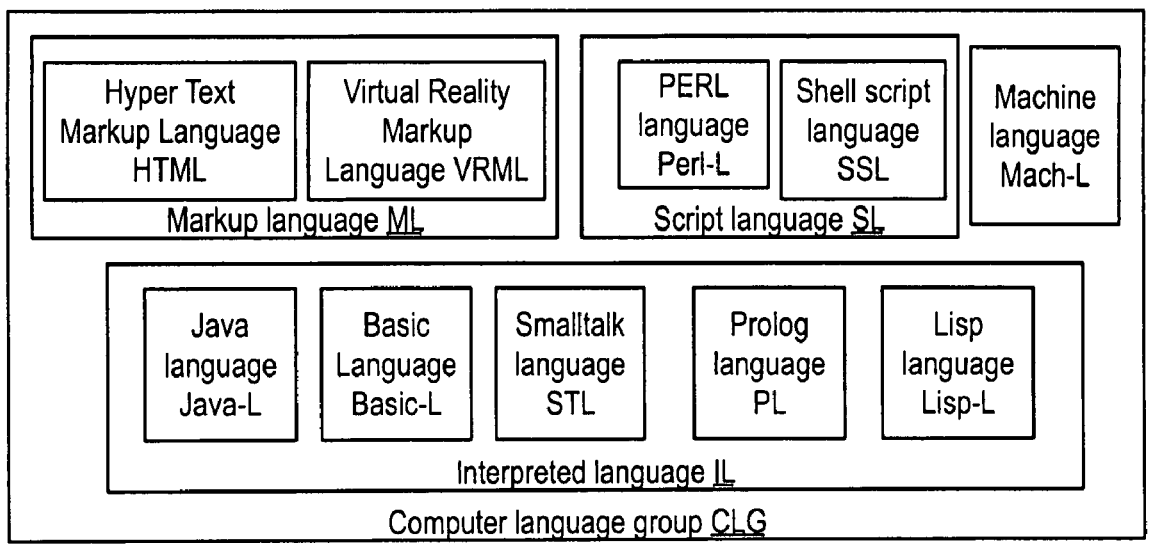
FIG. 16B shows the computer language group, whose members may be used to implement the program systems of the previous Figures and/or the installation package of FIGS. 17A and 17B.

The program steps may preferably be compatible with a computer language belonging to at least one member of the computer language group CLG as shown in FIG. 16B: consisting of a markup language ML, an interpreted language IL, a script language SL and a machine language Mach-L.

The markup language may preferably include a version of Hyper Text Markup Language (HTML) and/or a version of Virtual Reality Markup Language (VRML).

The interpreted language may preferably include a version of the Java language Java-L, a version of the Basic language Basic-L, a version of the Smalltalk language STL, a version of the Prolog language PL, and/or a version of the LISP language Lisp-L.

The script language may preferably include a version of the PERL language Perl-L and/or a version of a shell script language SSL.

The machine language Mach-L may preferably include a version of a Single Instruction Single Datapath (SISD) machine language, a version of a Single Instruction Multiple Datapath (SIMD) machine language, a version of a Multiple Instruction Single Datapath (MISD) machine language, and a version of a Multiple Instruction Multiple Datapath (M) machine language. The program steps may be in a relocatable or non-relocatable format.

Figure 17A:
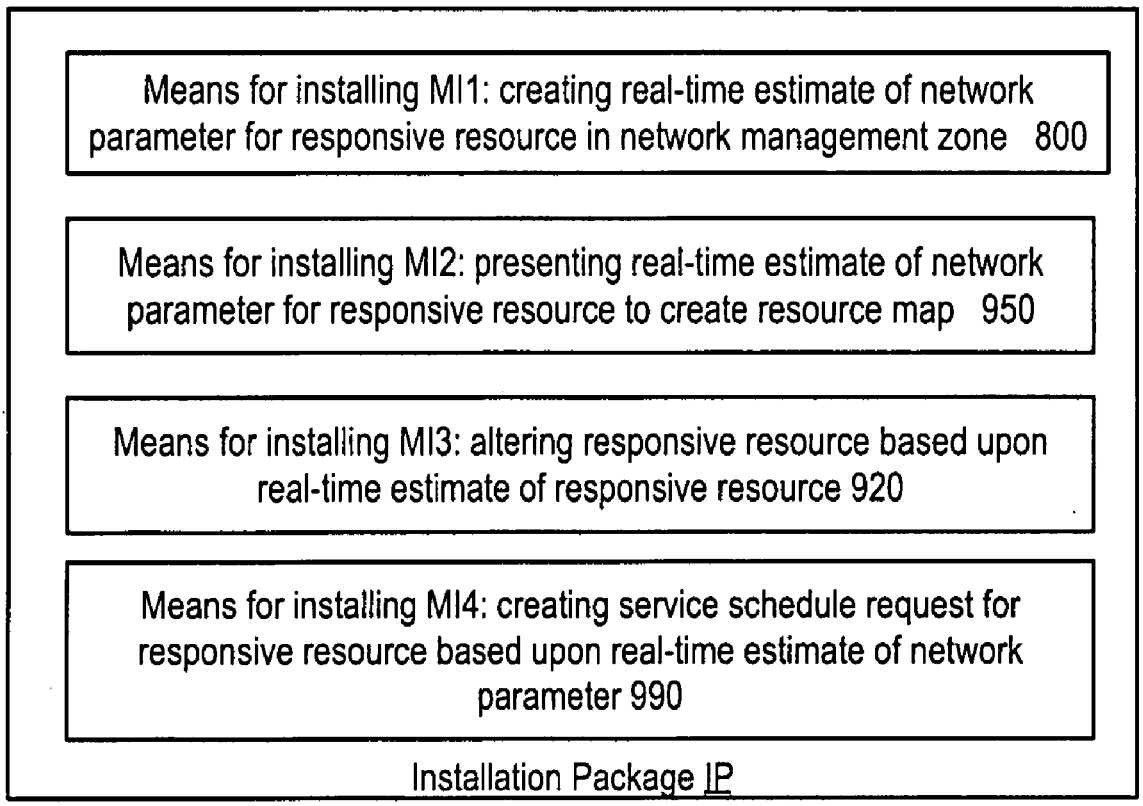
FIGS. 17A and 17B show an installation package for the invention's method and its use to create the management node.

The invention also includes an installation package IP for communicating the invention's method including at least one member of the installation means group as shown in FIG. 17A consisting of:

A first means for installing MI1 the step 800 creating the real-time estimate 450 of at least one network parameter 500 for at least one responsive resource 600 to the management protocol 700 in the network management zone 300, and/or A second means for installing MI2 the step 950 presenting the real-time estimate of the network parameter for the responsive resource to create a resource map 980 of the network management zone, and/or A third means for installing MI3 the step 920 altering at least one of the responsive resources based upon the real-time estimate of the at least one network parameter, and/or A fourth means for installing MI4 the step 990 creating a service schedule request 770 for the responsive resource based upon the estimate of the network parameter.

Figure 17B:
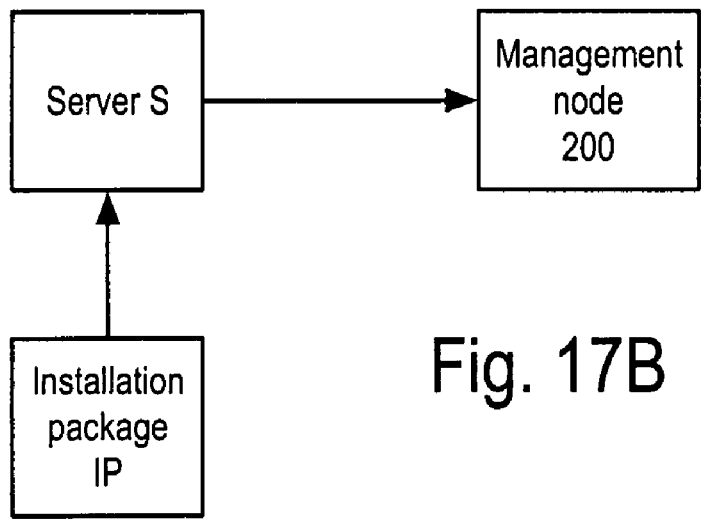

The installation package IP may be communicated by a server to create a management node 200 as shown in FIG. 17B.

By way of example, the installation package IP may be downloaded from the server S, possibly for a subscription fee over the Internet to a computer 200-C. Once installed, the application program displays a browser window type graphical user interface (GUI) as a control console.

It installs an SNMP manager that preferably collects mean opinion score (MOS) statistics and path information related to a number of remote VoIP clients. Each such client has an SNMP router that can preferably respond to the SNMP manager.

The SNMP communication provides network quality information about packet latency, jitter, and number of dropped packets. A pathway utility manipulates the TTL field in the packets being sent out to point-by-point discover the ISP-to-ISP pathways taken by various VoIP connections to the clients. The MOS statistics and other data are supplied in a browser GUI to an enterprise administrator console for selection of particular codec's and ISP's that will provide optimum quality.

At least one of these members of the installation means group includes at least one member of the installation mechanism group consisting of: a computer program system installation mechanism, a finite state machine installation mechanism, and an inferential engine installation mechanism.

In general, implementing a VoIP system requires that its network to be stable and have a low incidence of errors. Embodiments of the present invention monitor the network to insure that it provides the high performance, low error rate environment required by VoIP applications. If any VoIP link 602 used in the network management zone 300 generates too many errors, or it becomes too saturated with traffic, the problem can be quickly and easily pin-pointed. Control thresholds are easily set to automatically monitor and report that all links on the network are healthy and able to provide the stability that VOIP systems need.

Consider again FIG. 10. Suppose that the latency of the third link 602-3 suddenly becomes large, much larger that the latency of the fourth link 602-4. The management node 200 may preferably send the first router 600-R1 a link configuration message 760 to reroute the VoIP phone call packets from User A to User C to use the fourth link, and a second link configuration message to the fourth router 600-R4 to use the fourth link for VoIP phone call packets from User C to User A.

Similarly, suppose that the packet loss of the third link 602-3 suddenly becomes large, much larger that of the fourth link 602-4. The management node 200 may preferably send the first router 600-R1 the link configuration message 760 to reroute the VoIP phone call packets from User A to User C to use the fourth link, and the second link configuration message to the fourth router 600-R4 to use the fourth link for VoIP phone call packets from User C to User A.

Consider an installation package IP available as a non-volatile memory component and/or as a download from the server S. When installed the management node 200 provides a resource map 980 enabling users to find network bottlenecks, view the current utilization of any network interface, locate errors and broadcast storms, isolate virus/worm outbreaks, and justify equipment/link upgrades by providing objective details on network usage. Next generation network monitoring includes automatic performance monitoring of all network interfaces, no lengthy setup should be required. It preferably adapts to network changes so no ongoing maintenance is required. It has a minimal network impact, because system 100 doesn't flood the network with empty requests. Alerts are issued when monitored interfaces go over threshold, providing real-time information on what the network is doing. Typical operations staff should be able to effectively use the solution within an hour. The installation is quick and easy installation, takes less than one hour to install and auto configure. The hardware requirements are minimal, and affordable.

In further detail, the management node 200 may preferably keep track of service contracts for each responsive resource 600 in the network management zone 300 so the service contract information is accessible. Users are preferably alerted when service contracts are due to expire, possibly by the management node creating a monthly service contract report and/or sending a reminder email prior to each service contract's expiration, preventing lapses in support contracts.

Each responsive resource 600 may report how long it has been online and servicing the network management zone 300. This determines the general reliability and stability of the network hardware. Being familiar with this statistic helps users to evaluate when equipment should be replaced or serviced. Tracking errors on all responsive resources provides users with an unabridged vision of the network management zone's health. Monitoring server 650 interfaces permits detecting errors on server Network Interface Cards (NIC's), such as duplex issues or collisions. Monitoring server interfaces for usage shows when there's no usage on servers, supporting easy prediction of when there will be low usage on the server.

Watching the usage of each Internet link 602 can help detect abnormal usage. Typically, most Internet links have a lot of inbound traffic flows for servicing web browsers and other inbound information requests. Strange outbound traffic flows during certain hours may indicate inappropriate usage, like a hacker or illegal file sharing on the network. The management node 200 can track the utilization back to a specific interface by checking each interface on the responsive resource 600 for a matching pattern of utilization to locate the specific machine that is generating the traffic.

The preceding embodiments provide examples of the invention and are not meant to constrain the scope of the following claims.

What is claimed is:

1. A method for observing a network management zone, comprising the step:
  creating a real-time estimate of at least one network parameter for at least one responsive resource in said network management zone; and
  wherein each of said responsive resources in said network management zone respond to said management protocol compatible with a version of a Simple Network Management Protocol (SNMP);
  wherein the step creating said real-time estimate, further comprises the steps:
  sending at least one request in a management protocol to said responsive resource at a transmission time;
  measuring a response to said request from said responsive resource based upon said transmission time to contribute to said real-time estimate of said network parameter;
  measuring a non-response to said request from said responsive resource after a time-out from said transmission time to further contribute to said real-time estimate of said network parameter;
  wherein said network management zone includes:
    each of said responsive resources capable of responding to said request to said responsive resource, and
    at least one management node sending at least one of said requests to at least one of said responsive resources in said network management zone, wherein said management node further receives said responses to said requests from said responsive resources;
  means for creating said real-time estimate of said at least one network parameter for said at least one responsive resource to said management protocol in said network management zone, further comprising:
    means for sending said at least one request in said management protocol to said responsive resource at said transmission time;
    means for measuring said response to said request from said responsive resource based upon said transmission time to contribute to said real-time estimate of said network parameter; and
    means for measuring said non-response to said request from said responsive resource after said TTL to further contribute to said real-time estimate of said network parameter.

2. The method of claim 1, wherein said version of said SNMP includes at least one member of the group consisting of: SNMP v1, SNMP v2c, and SNMP v3.

3. The method of claim 1, wherein said real-time estimate is based upon said requests with said transmission time within the last N minutes.

4. The method of claim 1, wherein said responsive resource implements at least one member of the group consisting of: a server, a router, a bridge, a switch, a firewall, a wireless router, a base station, a wireless hub, a workstation, a cable modem, a Digital Subscriber Line (DSL) modem, a Voice over IO (VoIP) phone, a video conferencing station, a VoIP gateway, an analog telephony attachment, and a Public Branch eXchange.

5. The method of claim 1, wherein said network management zone further includes a link between a first of said responsive resources as a first responsive resource and a second of said responsive resources as a second responsive resource.

6. The method of claim 5, wherein the step creating said real-time estimate of said network parameter for said at least one responsive resource, further comprises the step:
  creating said real-time estimate of said network parameter for said second responsive resource via said link to said first responsive resource;
  wherein the step sending said request to said responsive resource, further comprises the step:
  sending said request in said management protocol to said second responsive resource at a transmission time via said first responsive resource and via said link; and
  wherein the step measuring said response from said responsive resource, further comprises the step:
  measuring said response to said request from said first responsive resource via said link from said second responsive resource.

7. The method of claim 5, wherein said link employs at least one instance of at least one member of the group consisting of the members: a wireless physical transport and a wireline physical transport.

8. The method of claim 7, wherein said wireless physical transport includes a radio frequency physical transport, a micro-wave frequency physical transport, a light frequency physical transport, an infra-red frequency physical transport, and an ultrasonic physical transport;
  wherein said wireline physical transport includes a wire-based physical transport, a waveguide physical transport, and an optical fiber physical transport.

9. The method of claim 5, wherein said network parameter is a member of the network parameter group consisting of the members:
  a packet loss including at least one member of the group consisting of
  a resource packet loss for said responsive resource;
  a link packet loss for said link; and
  a message packet loss for a message;

a latency, including at least one member of the group consisting of:
  a latency for said responsive resource;
  a unidirectional latency to said first responsive resource through said link to said second responsive resources;
  a bidirectional latency between said first responsive resource through said link to said second responsive resource; and
  a message latency for said message;
a jitter, including at least one member of the group consisting of:
  a latency jitter as a variance of said latency;
  a unidirectional jitter as said variance of said unidirectional latency;
  a bidirectional jitter as said variance of said bidirectional latency; and
  a message latency jitter for said variance of said message latency;
a link utilization capacity of said link; and
a resource utilization capacity of said resource.

10. The method of claim 1, further comprising at least one member of the group consisting of the steps:
  presenting said real-time estimate of said at least one network parameter for said at least one responsive resource to create a resource map of said network management zone;
  altering at least one of said responsive resources based upon said real-time estimate of said at least one network parameter; and
  creating a service schedule request for said responsive resource based upon at least one of said estimate of said network parameter.

11. The method of claim 10,
  wherein the step presenting said real-time estimate further comprises at least one member of the group consisting of the steps:
  updating a table based upon at least one member of the response group consisting of: said response and said non-response, both to said request to said responsive resource; wherein said table contains said real-time estimate of said network parameter for said responsive resource at a time step, for at least one of said responsive resources, for at least one of said network parameters, and for at least two of said time steps
  integrating said table based upon an external real-time estimate of said network parameter received from said responsive resource, for at least one of said responsive resources and for at least one of said network parameters;
  wherein the step altering said responsive resource, further comprises at least one member of the group consisting of the steps:
  sending a link configuration message to said responsive resource to create a link table entry in said responsive resource;
  sending a reset message to said responsive resource to reset said responsive resource; and
  sending a connectivity test message to said responsive resource to create a connectivity status message sent from said responsive resource to said management node; and
  wherein said service schedule request includes at least one member of the service activity group consisting of the members:
  replace said responsive resource;
  replace a non-volatile storage module included in said responsive resource;
  confirm a link for said responsive resource;
  create said link for said responsive resource;
  create said link table entry for said link in said responsive resource; and
  alter said link table entry for said link in said responsive resource.

12. The method of claim 10, further comprising the step:
  receiving a requested-service-completed message for said service schedule request.

13. The real-time estimate of the network parameter, as a product of the process of claim 1.

14. The method of claim 1, further comprising:
  constructing a quality of service measure based upon said real-time estimate of at least two of said network parameters.

15. The method of claim 14, wherein the step constructing said quality of service, further comprises the step:
  constructing said quality of service measure based upon said real-time estimate of at least two of said network parameters and based upon a codec.

16. The method of claim 15, wherein the step constructing said quality of service, further comprises the step:
  constructing said quality of service measure based upon said real-time estimate of a latency, said real-time estimate of a jitter, said real-time estimate of a packet loss and based upon said codec.

17. The method of claim 16, wherein said quality of service measure is a version of a Mean Opinion Score.

18. The quality of service measure as a product of the process of claim 14.

19. The management node of claim 1, further comprising:
  means for altering at least one of said responsive resources based upon said real-time estimate of said at least one network parameter.

20. The management node of claim 19, wherein said means for altering, further comprises at least one member of the group consisting of:
  means for sending a link configuration message to said responsive resource to create a link table entry in said responsive resource;
  means for sending a reset message to said responsive resource to reset said responsive resource; and
  means for sending a connectivity test message to said responsive resource to create a connectivity status message sent from said responsive resource to said management node.

21. The management node of claim 20, wherein at least one member of the altering message group is compatible with a version of the Internet Control Management Protocol (ICMP); and
  wherein said altering message group consists of the members: said link configuration message, said reset message, and said connectivity test message.

22. The management node of claim 1, further comprising:
  means for presenting said real-time estimate of said at least one network parameter for said at least one responsive resource to create a resource map of said network management zone.

23. The management node of claim 22, wherein the means for presenting, comprising:
  a table containing said real-time estimate of said network parameter for said responsive resource at a time step, for each of said responsive resources, for each of said network parameters, and for at least two of said time steps; and means for updating said table based upon at least one member of the response group consisting of: said response and said non-response, both to said request to said responsive resource.

24. The management node of claim 23, wherein the means for presenting, further comprises:
means for translating said table to a display template; and
means for transferring said display template to a management screen presented to a network manager;
means for collecting a network command response from said network manager based upon said management screen presenting said display template;
means for directing network activities based upon said network command response.

25. The management node of claim 24, wherein the means for directing network activities, comprises at least one member of the group consisting of:
means for posting a first service request for at least one of said responsive resources;
means for posting a second service request for a link between a first of said responsive resources and a second of said responsive resources; and
means for posting a control message request to a means for altering at least one of said responsive resources.

26. The management node of claim 25, wherein the means for directing network activities, further comprises at least one member of the group consisting of:
means for tracking said first service request for said responsive resource;
means for tracking said second service request for said link between said first responsive resource and said second responsive resource; and
means for tracking said control message request to said means for altering said responsive resource.

27. The management node of claim 22, wherein at least one member of the means group includes at least one instance of at least one member of the group consisting of:
a computer accessibly coupled to a memory and directed by a program system including at least one program step residing in said memory;
a finite state machine; and
an inferential engine;
wherein said computer includes at least one instruction processor and at least one data processor; wherein each of said data processors are at least partly directed by at least one of said instruction processors;
wherein said means group, consists of: means for creating, means for sending, means for measuring said response, said means for measuring said non-response, a means for altering said responsive resource, a means for constructing a quality of service measure based upon said real-time estimate of at least two of said network parameters, and said means for presenting.

28. A program system for implementing the method of claim 1, comprising program steps residing in a non-volatile memory component;
wherein said program system, further comprises at least one member of the group consisting of the program steps:
creating said real-time estimate of said at least one network parameter for said at least one responsive resource to said management protocol in said network management zone;
presenting said real-time estimate of said at least one network parameter for said at least one responsive resource to create a resource map of said network management zone;
altering at least one of said responsive resources based upon said real-time estimate of said at least one network parameter; and
creating a service schedule request for said responsive resource based upon at least one of said estimate of said network parameter.

29. The program system of claim 28, wherein said non-volatile memory component includes at least one instance of at least one member of the group consisting of: a semiconductor non-volatile memory component, a magnetic non-volatile memory component, an optical non-volatile memory component, and a ferroelectric non-volatile memory component.

30. The program system of claim 28, wherein said non-volatile memory component installs the method through communicating with at least one computer to create an installation of said program system in a memory accessibly coupled to said computer.

31. The program system of claim 28, wherein said program steps are compatible with a computer language belonging to at least one member of the computer language group consisting of: a markup language; an interpreted language; a script language; and a machine language.

32. The program system of claim 31, wherein said markup language, includes: a version of Hyper Text Markup Language (HTML) and a version of Virtual Reality Markup Language (VRML);
wherein said interpreted language, includes: a version of Java, a version of Basic, a version of Smalltalk, a version of Prolog, and a version of LISP;
wherein said script language, includes: a version of PERL and a version of a shell script language; and
wherein said machine language, includes: a version of a Single Instruction Single Datapath (SISD) machine language, a version of a Single Instruction Multiple Datapath (SIMD) machine language, a version of a Multiple Instruction Single Datapath (MISD) machine language, and a version of a Multiple Instruction Multiple Datapath (MIMD) machine language.

33. The program system of claim 31,
wherein the program step altering said responsive resource, further comprises at least one member of the group consisting of the program steps:
sending a link configuration message to said responsive resource to create a link table entry in said responsive resource;
sending a reset message to said responsive resource to reset said responsive resource; and
sending a connectivity test message to said responsive resource to create a connectivity status message sent from said responsive resource to said management node; and
wherein the service schedule request includes at least one member of the service activity group consisting of the members:
replace said responsive resource;
replace a non-volatile storage module included in said responsive resource;
confirm at least one link for said responsive resource;
create said link for said responsive resource;
create said link table entry for said link in said responsive resource; and
alter said link table entry for said link in said responsive resource.

34. The program system of claim 31, further comprising the program step:

receiving a requested-service-completed message for said service schedule request.

35. An installation package for communicating the method of claim 1, comprising at least one member of the installation means group consisting of:
- means for installing the step creating said real-time estimate of said at least one network parameter for said at least one responsive resource to said management protocol in said network management zone;
- means for installing the step presenting said real-time estimate of said at least one network parameter for said at least one responsive resource to create a resource map of said network management zone;
- means for installing the step altering at least one of said responsive resources based upon said real-time estimate of said at least one network parameter; and
- means for installing the step creating a service schedule request for said responsive resource based upon at least one of said estimate of said network parameter.

36. The installation package of claim 35, wherein a server communicates said installation package to create said management node.

37. The installation package of claim 35, houses in a non-volatile memory component.

* * * * *